(12) United States Patent
Mahalle et al.

(10) Patent No.: US 11,823,204 B2
(45) Date of Patent: Nov. 21, 2023

(54) METHODS AND SYSTEMS FOR VERIFYING ELECTRONIC PURCHASES INCLUDING RESTRICTED PRODUCTS AND PAYMENT PROCESSING THEREOF

(71) Applicant: MASTERCARD INTERNATIONAL INCORPORATED, Purchase, NY (US)

(72) Inventors: Rajesh Pralhadrao Mahalle, Pune (IN); Surbhi Malhotra, Pune (IN); Vijay Nath, Pune (IN); Pallav Sharma, Pune (IN)

(73) Assignee: MasterCard International Incorporated, Plano, TX (US)

( * ) Notice: Subject to any disclaimer, the term of this patent is extended or adjusted under 35 U.S.C. 154(b) by 0 days.

(21) Appl. No.: 17/348,170

(22) Filed: Jun. 15, 2021

(65) Prior Publication Data

US 2022/0058648 A1 Feb. 24, 2022

(30) Foreign Application Priority Data

Aug. 24, 2020 (IN) .............................. 202041036390

(51) Int. Cl.
*G06Q 20/40* (2012.01)
*G06F 21/32* (2013.01)
(Continued)

(52) U.S. Cl.
CPC .......... *G06Q 20/405* (2013.01); *G06F 21/32* (2013.01); *G06Q 20/3255* (2013.01); *G06Q 20/40145* (2013.01); *G06Q 30/0607* (2013.01)

(58) Field of Classification Search
None
See application file for complete search history.

(56) References Cited

U.S. PATENT DOCUMENTS

2003/0177102 A1 9/2003 Robinson
2016/0267561 A1 9/2016 Atikoglu et al.
(Continued)

OTHER PUBLICATIONS

Unknown, "Online Age Verification: How to Prevent Sales to Minors Without Alienating Legitimate Customers", Innovations in Identity, Trulioo, Apr. 25, 2019, 6 pages, https://www.trulioo.com/blog/online-age-verification/.
(Continued)

*Primary Examiner* — Namrata Boveja
*Assistant Examiner* — Amit Patel
(74) *Attorney, Agent, or Firm* — Barta, Jones & Foley, PLLC

(57) ABSTRACT

Embodiments provide methods and systems for verifying plurality of user attributes corresponding to a purchase of a user, including restricted products. Methods include receiving a payment request for purchasing a plurality of products, determining plurality of attributes to be verified for the payment request by applying regulatory rules on a products related information associated with the plurality of products, transmitting a payment link, to the merchant terminal including at least one user-specific attribute to be verified from the user. The methods further include receiving user-specific information associated with the at least one user-specific attribute, verifying the plurality of attributes by accessing one or more databases, based at least on checking the at least one general attribute by applying a set of pre-defined rules and performing validation of the user-specific information received from the user device and upon successful verification, processing the payment request initiated by the merchant terminal.

20 Claims, 11 Drawing Sheets

(51) Int. Cl.
  *G06Q 30/0601* (2023.01)
  *G06Q 20/32* (2012.01)

(56) References Cited

U.S. PATENT DOCUMENTS

2020/0098023 A1    3/2020  Agarwal et al.
2020/0387887 A1*  12/2020  Rathod ............. G06Q 20/3224

OTHER PUBLICATIONS

Unknown, "Payment Processing and Age Verification for High Risk Merchants", AgeChecker.net, Apr. 25, 2019, 6 pages, https://agechecker.net/payments/.

* cited by examiner

| PRODUCT NAME | RULE TYPE | REQUIRED IDENTITY | IDENTITY ATTRIBUTE | MERCHANT ID | POS ID |
|---|---|---|---|---|---|
| MCS SANITIZER | MERCHANT RESTRICTION | AADHAR CARD | AADHAR NUMBER | MID-OM-001 | PS:OM-1-M-P-P-01 |
| ABC CIGRATTES | GOVERNMENT RESTRICTION | AADHAR CARD /DL/ PASSPORT | AGE | MID-OM-001 | PS:OM-1-M-P-P-01 |
| N95 MASKS | MERCHANT RESTRICTION | OCCUPATION ID | MEDICAL OCCUPATION | MID-OM-001 | PS:OM-1-M-P-P-01 |

FIG. 5A

| PRODUCT NAME | RULE TYPE | ORDER RESTRICTION | FREQUENCY | REQUIRED IDENTITY | IDENTITY ATTRIBUTE | MERCHANT ID | POS ID |
|---|---|---|---|---|---|---|---|
| GYC EDIBLE OIL | MERCHANT RESTRICTION | 5 LITRE MAXIMUM | 1 MONTH | RATION CARD | RATION CARD NUMBER | MID-OM-001 | PS:0M-1-M-P-P-01 |
| MCS SANITIZER | GOVERNMENT RESTRICTION | <= 500ML | 1 WEEK | AADHAR CARD | NOT APPLICABLE | MID-OM-001 | PS:0M-1-M-P-P-01 |
| ABC CIGRATTES | GOVERNMENT RESTRICTION | NO | NO | AADHAR CARD /DL/ PASSPORT | AGE | MID-OM-001 | PS:0M-1-M-P-P-01 |
| N95 MASKS | GOVERNMENT RESTRICTION | 1 | 1 MONTH | MEDICAL OCCUPATION | MEDICAL OCCUPATION | MID-OM-001 | PS:0M-1-M-P-P-01 |
| PQR WHEAT FLOUR | MERCHANT RESTRICTION | 10 KG MAXIMUM | NO | RATION CARD | ADDRESS <= 10km RADIUS | MID-OM-001 | PS:0M-1-M-P-P-01 |

FIG. 5B

METHODS AND SYSTEMS FOR VERIFYING ELECTRONIC PURCHASES INCLUDING RESTRICTED PRODUCTS AND PAYMENT PROCESSING THEREOF

CROSS-REFERENCE TO RELATED APPLICATION(S)

This application claims priority to IN Patent Application No. 202041036390, filed Aug. 24, 2020, entitled "METHODS AND SYSTEMS FOR VERIFYING ELECTRONIC PURCHASES INCLUDING RESTRICTED PRODUCTS AND PAYMENT PROCESSING THEREOF", the entirety of which is incorporated herein by reference.

TECHNICAL FIELD

The present disclosure relates to payment technology and, more particularly, to verifying electronic purchases including restricted items or products by checking multiple attributes related to restricted items or products and processing the corresponding payments.

BACKGROUND

Nowadays, as technology is growing, online payment has become one of the most adopted technologies. From a huge showroom to a small retail shop, every merchant is accepting digital payment and encouraging cashless transactions. While the items can be purchased online, it increases burden on the law enforcement agencies to ensure compliance on sale of items that are restricted for sale in some or the other way, for example, restricted by age, quantity, or location. Some examples of these items are liquor, cigarettes, tobacco products, certain prescription drugs, and other essential items depending upon the existing situation.

As digital payment transactions are increasing, employing measures to check for restricted products such as tobacco, alcohol, etc., is becoming challenging. The payment organizations are investing more and more resources to authenticate users' identity and/or check one or more indicators such as age, occupation, etc., for every transaction amidst millions of such transactions every day. Further, digital payment transactions gain even more importance in situations where the world goes through a crisis such as the COVID-19 pandemic. In situations like the COVID-19 pandemic, there are restrictions on the sale of an increased number of items than usual, such as masks, hand sanitizers, personal protection equipment (PPE), and some essential items in countries which are facing a shortage of such items.

Currently available techniques to monitor the sale of restricted items are quite cumbersome for users and merchants. The majority of these techniques are performed by means setup at the merchant and require uploading the identity documents by the customer, and also needs the customer's presence near the merchant. Further, such identity verification systems are not full proof when it comes to the online purchase of items, and more so, when the merchants are small merchants without having any means set up locally at the merchant locations. Further, when a single order contains multiple types of products, each having different restrictions, performing verification as per applicable regulations adds to the challenge. Hence, there exists a need for methods and systems to address these technical challenges and to offer technological solutions for online purchases including restricted items or products for the customers.

SUMMARY

Various embodiments of the present disclosure provide systems and methods for verifying electronic purchases including restricted products through a payment link. The method includes receiving, by a payment server, a payment request for purchasing a plurality of products. The payment request may be associated with a merchant terminal. The method includes determining a plurality of attributes to be verified for processing the payment request. The plurality of attributes is determined based at least on applying a set of regulatory rules on products related information associated with the plurality of products. The plurality of attributes may include at least one general attribute and at least one user-specific attribute. The method further includes transmitting a signal to the merchant terminal, the signal including a payment link and at least one user-specific attribute of the plurality of attributes to be verified from a user. The merchant terminal may facilitate sending the payment link to a user device of the user. The method includes receiving user-specific information associated with the at least one user-specific attribute. The user-specific information may be provided as input by the user on the user device by accessing the payment link. Further, the method includes, verifying the plurality of attributes by accessing one or more databases, based at least on: checking the at least one general attribute by applying a set of pre-defined rules and performing validation of the user-specific information received from the user device. Upon successful verification, the method includes processing the payment request associated with the payment initiated by the merchant terminal.

In another embodiment, a server system is disclosed. The server system includes a communication interface, a memory including executable instructions and a processor communicably coupled to the communication interface. The processor is configured to execute the executable instructions stored in the memory and thereby cause the server system to at least in part receive a payment request for purchasing a plurality of products. The payment request may be associated with a merchant terminal. The payment server is caused to determine a plurality of attributes to be verified for processing the payment request. The plurality of attributes may be determined based at least on applying a set of regulatory rules on a products related information associated with the plurality of products. The plurality of attributes may include at least one general attribute, and at least one user-specific attribute. The payment server is further caused to transmit a signal to the merchant terminal, the signal including a payment link and at least one user-specific attribute of the plurality of attributes to be verified from a user. The merchant terminal may facilitate sending the payment link to a user device of the user. The payment server is caused to receive user-specific information associated with the at least one user-specific attribute. The user-specific information may be provided as input by the user on the user device by accessing the payment link. The payment server is caused to verify the plurality of attributes by accessing one or more databases, based at least on: checking the at least one general attribute by applying a set of pre-defined rules, and performing validation of the user-specific information received from the user device. Upon successful verification, the payment server is caused to process the payment request associated with the payment initiated by the merchant terminal.

In another embodiment, a payment processing method is disclosed. The method includes receiving, by a payment server, a payment request including products related information of a plurality of products in a purchase of a user. The payment request may be associated with a merchant terminal. The payment processing method includes determining a plurality of attributes to be verified for processing the payment request. The plurality of attributes may be determined based at least on applying a set of regulatory rules on the products related information and the plurality of attributes including at least one general attribute, and at least one user-specific attribute. The payment processing method further includes performing a prior verification. The prior verification includes, checking if the information associated with at least one of the plurality of attributes is already available in one or more databases. The payment processing method includes generating, the payment link including the at least one user-specific attribute for which the information is not already available. Further, the payment processing method includes transmitting a signal to the merchant terminal. The signal includes the payment link and at least one user-specific attribute of the plurality of attributes to be verified from the user. The merchant terminal may facilitate sending the payment link to a user device of the user. The payment processing method includes receiving user-specific information associated with the at least one user-specific attribute. The user-specific information may be provided as input by the user on the user device by accessing the payment link. The payment processing method includes authenticating, by the payment server, a user identity via one of a biometric authentication or a security question authentication. The method includes verifying the plurality of attributes by accessing one or more databases, based at least on: checking the at least one general attribute by applying a set of pre-defined rules and performing validation of the user-specific information received from the user device. Upon successful verification, the method further includes, processing the payment request associated with the payment initiated by the merchant terminal.

In another embodiment, a computer program product comprising at least one non-transitory computer-readable storage medium is disclosed. The computer-readable storage medium includes a set of instructions, which, when executed by at least one processor, causes a server system to at least perform a method including receiving a payment request for purchasing a plurality of products. The payment request may be associated with a merchant terminal. The server system is caused to perform determining a plurality of attributes to be verified for processing the payment request. The plurality of attributes may be determined based at least on applying a set of regulatory rules on a products related information associated with the plurality of products. The plurality of attributes may include at least one general attribute, and at least one user-specific attribute. The server system is further caused to perform transmitting a signal to the merchant terminal. The signal may include a payment link and the at least one user-specific attribute of the plurality of attributes to be verified from a user. The merchant terminal may facilitate sending the payment link to a user device of the user. Further, the server system is caused to perform receiving user-specific information associated with the at least one user-specific attribute. The user-specific information may be provided as input by the user on the user device by accessing the payment link. The server system is further caused to perform verifying the plurality of attributes by accessing one or more databases, based at least on checking the at least one general attribute by applying a set of pre-defined rules, and performing validation of the user-specific information received from the user device. Upon successful verification, the server system is caused to perform processing the payment request associated with a payment initiated by the merchant terminal.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIGS. 5A and 5B are tables stored in the rules repository including merchant and regulatory authority defined rules, in accordance with an example embodiment;

Figure 1:
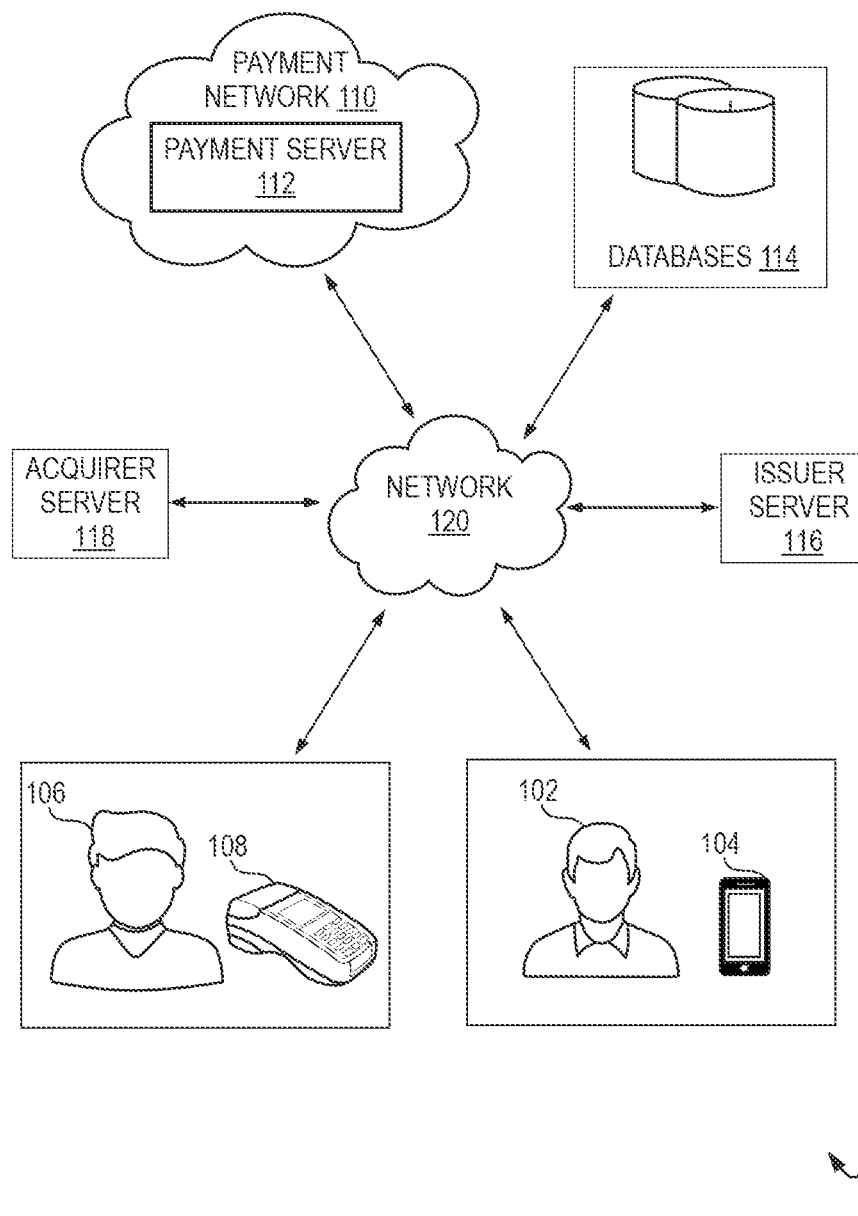
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Mastercard®, VISA®, Discover®, American Express®, etc.

The term "Merchant ID", used throughout the description, refers to a unique identification code given to the merchant by a payment network, or the acquirer bank associated with a merchant account. The merchant ID may be used to uniquely identify the merchant.

The term "POS ID", used throughout the description, refers to an identifier given by the POS terminal manufacturer or the acquirer server to the merchant terminal associated with a merchant. POS ID may be used by the payment network servers to determine which POS terminal a payment request is getting generated from.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide systems and methods for verifying electronic purchases of a user, including a plurality of restricted products.

In various example embodiments, the present disclosure describes payment server associated with a payment network and methods thereof, where the payment server is configured to determine a plurality of attributes of a user to be verified for a payment request received from a merchant terminal. The payment request may correspond to a purchase of the user. The purchase may be carried out via call or an online page of the merchant, to buy a plurality of products. The payment server is communicably coupled to the merchant terminal and a user device. The merchant terminal may be one of a POS terminal, a mobile phone, a laptop, etc. The user may purchase the plurality of products, by calling the merchant or by accessing an online page associated with the merchant that facilitates the user to select plurality of product for the purchase. The merchant terminal may be configured to send a payment request to the payment network. The payment request may include a merchant ID, POS ID, an identifier associated with the user (e.g., a phone number of the user), and the products related information associated with the plurality of products present in the purchase of the user. The products related information may include a Boolean code or an integer code generated based on the plurality of products and the quantity of each of the plurality of products. In some embodiments, a list of plurality of products and the corresponding quantity of each product may also be included in the payment request and sent to the payment server.

In an embodiment, each merchant may have different criteria to be checked. To cater to this, every merchant may have to register to the payment server associated with the payment network using a Merchant ID, POS ID, and the criteria and/or restrictions that the merchant wants to impose on the items that the merchant sells and/or the criteria and/or restrictions as per the applicable law mandated by governing bodies. This registration process is called merchant on-boarding hereinafter. After the merchant is on-boarded, the merchant defined rules associated with the restrictions imposed by the particular merchant may be stored against his/her merchant ID and/or the POS ID, in a rules repository maintained by the payment server. The rules repository is also configured to store restrictions imposed by a regulatory authority or a third-party organization and manufacturer defined rules. The rules repository may thus include merchant restrictions that are specific to each merchant, the regulatory authority restrictions that are common to all the merchants, and the manufacturer define rules that are product specific.

In another example embodiment, the merchant may register along with his merchant category code (MCC) and the products that he provides to the users. The rules may be automatically applied by the payment server based on the products and the merchant category code. For example, if the merchant sells tobacco and alcohol, the payment server is configured to impose age restrictions without the merchant defining it.

One example of a merchant criteria or restriction may be certain drugs and N95 masks. For instance, there may be a restriction that only medical professionals may buy those drugs or N95 masks upon verifying their Occupation IDs and the like. Regulatory authority criteria or restrictions may be such as age restriction on tobacco and alcohol products and the like. In an additional embodiment, quantity restrictions and address restrictions may also be imposed by the regulatory authority or the merchant such as a user can only buy a maximum of 500 ml of sanitizer in a week, a maximum of 5 Lt of edible oil is allowed per user and the like.

In an embodiment, the user may call the merchant establishment and place an order for the purchase of a plurality of products and their corresponding quantities. The merchant after receiving the order may input the plurality of products ordered by the user and their corresponding quantities to the merchant terminal. The merchant terminal may be configured to determine products related information associated with the plurality of products included in the purchase of the user. The products related information may be a single code or a string of codes or identifiers that facilitate the payment server to identify what all rule checks have to be performed for the particular order based on the restrictions that the merchant has been on-boarded for. For example, the products related information may include a Boolean code, i.e., the merchant terminal may mark 1s and 0s and generate products related information. The merchant may be on-boarded for three restrictions and an order placed by the user needs all the three rule checks, then the products related information maybe 111.

In an alternate embodiment, the merchant associated with the merchant terminal may receive an order for the purchase of the plurality of products from the user. The merchant may send the plurality of products ordered by the user to the payment server. The payment server may be configured to generate the products related information based on the plurality of products or the payment server may be configured to get the product-related information from an external server by sending the plurality of products to the external server such as the acquirer server or the issuer server or a third-party server.

In an example, the user may order three products namely P1, P2, and P3 with quantities Q1, Q2, and Q3, respectively. The products related information may be a string of Boolean codes representing the product and the quantity of the product associated with the plurality of products. The products related information generated by the merchant terminal for the above example may be {001-010, 010-001, 011-101}. Here the pair of Boolean codes with a common representation of XXX-YYY may be given to each of the products, where 'XXX' represents the product type or category and 'YYY' represents the quantity of the corresponding product.

Further, the payment request may be sent from the merchant terminal to the payment server. The payment request including the products related information of the plurality of products, merchant ID, an identifier associated with the user, and POS ID may be sent to the payment server from the merchant terminal. The payment server may then run rule checks on the payment request based on the products related information associated and the merchant ID present in the payment request to determine a plurality of attributes that have to be verified for the user before the payment for the corresponding purchase of the user is processed. Running rule checks may be performed by applying a set of regulatory rules on the products related information present in the payment request. The set of regulatory rules may include merchant defined rules, regulatory authority (such as Government, local agencies, civic bodies, or any organization or department) defined rules and/or manufacturer defined rules. The manufacturer defined rules refer to the rules defined for a specific product by its manufacturer. The merchant ID or the POS ID is used to apply the rules associated with the specific merchant from whom the payment request is received. Further, the regulatory authority defined rules and the manufacturer defined rules are also checked, based on the application of the set of regulatory rules. The payment server includes a rules repository consisting of restrictions or criteria defined by each merchant stored against the merchant ID or the POS ID, the restrictions or criteria defined by the regulatory authority, and the manufacturer defined rules for specific products.

In an additional embodiment, the payment request may also include the products and their corresponding quantities that the user included in his/her order. The list of products may be used to apply the regulatory rules and run rule checks along with the products related information and the merchant ID or the POS ID.

In an alternate embodiment, the payment request to purchase a plurality of products may be received by the payment server, from the merchant terminal. An external server such as an acquirer server may receive the same from the merchant terminal and determine products related information based on the plurality of products for which the payment request is received. The external server may be configured to send the products related information to the payment server. Further, the payment server is configured to process the payment as discussed below.

The payment server may check for already available information regarding the plurality of attributes in one or more databases stored against the identifier associated with the user (e.g., a phone number of the user) present in the payment request. Without limiting to the scope of the present disclosure, the plurality of attributes may be of two types, one being general attributes and another being user-specific attributes. The general attributes may be associated with the attributes that can be verified by the payment server by applying a set of pre-defined rules, without needing any user-specific information from the user. For example, if a quantity attribute has to be checked for a product from the plurality of attributes, the payment server may access one or more databases to check the historical purchase data of the user within a pre-defined time period to determine the quantity of the particular product that is already bought by the user in the pre-defined amount of time, say last one month.

The one or more databases may be directly accessed by the payment server or in an alternate embodiment, the databases may be maintained in one or more external server systems such as a centralized digital identity (ID) server. The centralized digital ID server may be configured to store a plurality of documents and details associated with the plurality of users. The plurality of documents and details may be used to authenticate the user for any services. The documents and details stored in a database in the digital ID server may be government IDs, personal IDs, and details stored by the user by registering to the centralized digital ID server. When the databases are directly accessible, the payment server may retrieve the documents and details by directly querying the one or more databases. In the alternate embodiment, the payment server may communicate with the centralized digital ID server or any external server including one or more databases, and retrieve the documents and details required for the verification.

Further, the user-specific attributes may be the attributes from the plurality of attributes that may need user-specific information from the user. The user-specific information may be an identity document, an official document, a unique identity number, and the like. The user-specific attributes may be needed for verification of age, occupation, location of the user or the merchant, and the like.

In an embodiment, the payment server may check the one or more databases using the identifier associated with the user that may be the user's contact number (e.g., phone number) to determine if the information regarding the general attributes of the plurality of attributes is already present in the databases. For example, the databases may include a regulatory database, a digital identity (ID) database, and an order history database. The payment server may check for already available information regarding the general attributes in the one or more databases and verify those attributes if any information is already available, without needing any extra input from the users. In an example embodiment, if a user-specific information such as a previously authenticated official document is already uploaded and stored on one of the databases, user specific attributes may also be treated as a general attribute and may be verified without needing any user-specific information to be sent from the user.

In an example embodiment, assume a restriction is defined that a user can only buy 500 ml of sanitizer per month and a purchase of the user includes 400 ml of sanitizer. In this example, the payment server may check the historical purchase data of the user to determine if the user has already bought sanitizer with quantity less than or equal to 100 ml, within pre-defined time period of one month. If the user has already bought more than 100 ml sanitizer within last one month, the purchase of the user can be denied by the payment server, and a decline message can be sent to the merchant terminal.

In an embodiment, after the payment server has verified the general attributes with already present information in the databases, the payment server may generate a payment link that when accessed by the user, will direct the user to input the user-specific information that are required by the payment server. The payment link may include at least one user-specific information of the plurality of attributes to be verified by the user. In an embodiment, the payment server is configured to transmit a signal including the payment link to the merchant terminal. The merchant terminal may then forward the payment link to the user device using the identifier associated with the user via means such as short messaging service (SMS), MMS, email, instant messaging through Internet, or any other means.

In an alternate embodiment, the merchant terminal may be configured to generate the payment link by itself and send the payment link directly to the user's device without the intervention of the payment server.

Further, in an embodiment, after the user receives the payment link on the user device, the user may click on the link and the link may access a web page managed by the payment network that will provide an interface to the user to input information regarding at least one user-specific attribute. The user may use the link to provide an ID number, or a picture of an ID card, etc., and send it to the payment server. In an example, the user may be requested to provide an occupation ID and the user may provide the same and send it to the payment server.

In an additional embodiment, the payment server may request a biometric or a security question authentication from the user before verifying the user-specific information sent by the user. The authentication process is performed to determine if the person that is utilizing the payment link to provide the user-specific information regarding the at least one user-specific attribute is an authentic person who is the holder of the identity proof that the user is providing.

In an embodiment, the payment server is configured to verify the user-specific information received from the user by checking the user-specific information against the user related data stored in one or more databases. If the user-specific information is validated, the payment server may further proceed to the payment processing. The payment may be processed as per the Business as Usual (BAU) flow, i.e., issuer server, acquirer server, and payment server processing the payment in the usual process flow. If the payment is successfully completed, a payment confirmation message may be sent to the user device from the payment server or in some cases, from the issuer server.

In some embodiments, the one or more databases may be directly accessible by the payment server. The payment server may directly retrieve the user-specific information from the databases by querying the one or more external databases. In alternate embodiments, the one or more external databases may be stored in one or more external servers. The external servers may belong to regulatory authorities and/or third-party organizations responsible for managing digital identities of the users for providing online authentication to the users. The payment server may communicate with the one or more servers for retrieving the user-specific information for authenticating the users.

Various embodiments of the present disclosure offer multiple advantages and technical effects. For instance, the present disclosure facilitates the verification of the plurality of user attributes for a single order placed by the user. Various embodiments of the present disclosure provide easy, fast, and secure ways for the plurality of user attribute checks for a single order placed by a user. A payment server may be configured to receive a payment request initiating from a merchant terminal and carry out attribute verification for the order placed by the user associated with the initiated payment. The merchant terminal is configured to generate products related information associated with the plurality of products. The payment server may perform a prior verification to determine if any data is already available for verification in one or more databases. This enables the reduction of time in verification and also reduces the inputs to be taken by the users hence savings user's work and time.

The payment server accesses databases to verify the attributes of the user. Issuer server, acquirer server, or any third-party server is not involved in the verification process. Hence the involvement of a plurality of server and remote devices is reduced which increases the processing speed of the whole process. Age verification for tobacco and alcoholic products proves to be promising in keeping minors away from ordering such products online. Further, biometric or a security question authentication provides an extra layer of security in determining that the user is authentic and is the one who the user claims to be. The biometric or security question authentication completely eradicates the use of other's official documents for such attribute checks by a second person or a fraudster.

The present disclosure is described with reference to products; however, teachings of the present disclosure can also apply for the services, and the term 'product' should also be understood to include the services of those nature that can be provided by the merchants to the users and where the services need certain regulations in terms of age of user, quantity of services, distance of users from the merchant, timings of availing the services, etc.

Various example embodiments of the present disclosure are described hereinafter with reference to FIGS. 1 to 9.

FIG. 1 illustrates an example representation of an environment 100 related to at least some example embodiments of the present disclosure. The environment 100 is depicted to include a user device 104 associated with a user 102. The environment 100 also includes a merchant terminal 108 associated with a merchant 106. The environment 100 further includes a payment network 110 and a payment server 112 associated with the payment network 110. The environment 100 further includes databases 114, an issuer server 116, and an acquirer server 118. The user device 104, merchant terminal 108, payment server 112, issuer server 116, and acquirer server 118 may be communicably coupled via a network 120.

The network 120 may include, without limitation, a local area network (LAN), a wide area network (WAN) (e.g., the Internet, etc.), a mobile network, a virtual network, and/or another suitable public and/or private network capable of supporting communication among a plurality of the parts, entities, or users illustrated in FIG. 1, or any combination thereof. For example, the network 120 may be a combination of different networks, such as a private network made accessible by the payment network 110 to the issuer server 116 and, separately, a public network (e.g., the Internet, etc.) through which the payment server 112, the issuer server 116, the acquirer server 118, the user device 104 and the merchant terminal 108 may communicate.

In the environment 100, the payment server 112 associated with the payment network 110 is configured to determine the plurality of attributes to be verified for the payment request associated with a purchase of a user 102. The payment server 112 is communicably coupled to the merchant terminal 108 and the user device 104. The merchant terminal 108 may be one of a POS terminal, a mobile phone, a laptop, etc. An order may be received from the user 102 over a call or an online page, by the merchant 106. The merchant terminal 108 is configured to generate a payment request based on the purchase of the user and send the payment request to the payment server associated with the payment network 110. The payment request may include a merchant ID, POS ID, the products related information associated with the plurality of products present in the purchase of the user 102, and an identifier associated with the user 102. In another example embodiment, the list of products along with the quantity corresponding to each product from the plurality of products that are ordered by the user 102 may also be included in the payment request.

In an example embodiment, a plurality of merchants such as the merchant 106 may be on-boarded by the payment server 112 by registering to the payment server 112 using a Merchant ID, POS ID, and the restrictions that the merchant 106 wants to impose on the products that the merchant 106 sells. After the merchant 106 is on-boarded, the restrictions associated with the merchant 106 may be stored at a rules repository in the payment server 112, against the merchant ID and/or the POS ID. The restrictions defined by the merchant 106 may be stored in the payment server 112. Further, in an example embodiment, the regulatory authority may also have imposed certain restrictions to the sale of certain products, the certain restrictions defined by the regulatory authority may also be stored in the payment server 112.

In another example embodiment, the merchant 106 may register himself with the payment network, using his merchant category code (MCC) and the products that he provides to the users. The rules may be automatically applied by the payment server 112 based on the products and the merchant category code. For example, if the merchant sells tobacco and alcohol, the payment server 112 is configured to impose age restrictions defined by the regulatory authority, without the merchant 106 defining it during the on-boarding process. This process is performed by the payment server 112, just by taking the MCC and the list of products sold by the merchant 106 during the merchant on-boarding.

Examples of merchant criteria or restriction may be high dosage drugs that can only be bought by medical professionals who must have an occupation ID check and the like. Regulatory authority criteria may be such as age and/or locality restriction for buying marijuana products and the like. In an additional embodiment, the buying frequency of a product, the quantity of the product being bought, and the address of the user 102 may also be restricted by the regulatory authority or the merchant. For example, the user 102 can only buy a maximum of 500 ml of sanitizer in a week, a maximum of 5 lt of edible oil is allowed per user and the like.

In an example, it is considered that the merchant 106 is on-boarded with three rule checks. The three rule checks may be age check for tobacco and alcoholic products, occupation check for N95 masks and certain drugs, and an address check for buying wheat flour with a restriction of the buyers being within 10 kms radius of merchant establishment. In the example, the user 102 may call the merchant 106 and order three items including a high dosage drug, cigarettes, and chocolate. The merchant 106 may input all of the products based on the purchase of user 102 to the merchant terminal 108. The merchant terminal 108 may be configured to determine products related information associated with the plurality of products present in the purchase of the user 102.

The products related information may be a Boolean code, a string of Boolean codes or identifiers that facilitate the payment server 112 to identify what rule checks have to be performed for the order. For example, the products related information may be a Boolean code, i.e., the merchant terminal 108 may mark is and 0s to generate products related information. In the example, the merchant terminal 108 may allocate products related information as "011", as there is a need to perform two out of the three rule checks that the merchant is on-boarded for, namely age and occupation rule checks for cigarettes and high dosage drugs, respectively. In an alternate embodiment, the merchant 106 may manually input the products related information to the merchant terminal 108.

In another example embodiment, the merchant terminal 108 may generate the products related information in a string format i.e., a set of paired Boolean codes, wherein each pair of Boolean code represents a product code and the quantity code associated with that product. In an example, the user 102 may order the following products with corresponding quantities: 1 pack of cigarettes, 5 kg rice and 7 lts of edible oil. In the example, the regulatory authority and/or merchant restriction for which the merchant 106 is on-boarded for may be such as a user can buy any amount of cigarettes if the age is greater than 21, a user can only buy 5 kg of rice per month, and a user can only buy 5 lt of edible oil per month. Therefore, the merchant terminal 108 may determine these restrictions on the purchase of the user 102 and generate a set of paired Boolean codes that may look like {001-001, 010-101, 011-101}. In the example, the products related information may be the above set of paired Boolean codes that will be sent to the payment server.

In an example embodiment, a payment request may be sent from the merchant terminal 108 to the payment server 112. The payment request may include products related information associated with the plurality of products, merchant ID, an identifier associated with the user 102 (e.g., a phone number of the user 102), and POS ID. The payment server 112 may then run rule checks on the payment request based on the products related information associated with the plurality of products and the merchant ID present in the payment request to determine the plurality of attributes that have to be verified for the user 102 before the payment for the corresponding order is processed. The merchant ID or the POS ID is used to run rule checks associated with the specific merchant from whom the payment request is received. The payment server 112 includes a rules repository (Not shown in FIG. 1) consisting of restrictions defined by each merchant stored against the merchant ID or the POS ID, the restrictions defined by the regulatory authority, or a third-party organization, and manufacturer defined rules. In the example, the payment server 112 may determine that the corresponding payment request needs an age and occupation check based on the products related information attribute.

In an alternate embodiment, the merchant 106 associated with the merchant terminal 108 may receive the order for the purchase of the plurality of products from the user 102. The merchant 106 may send the payment request including the plurality of products ordered by the user 102, to the payment server 112. The payment server 112 may be configured to generate the products related information based on the plurality of products present in the order placed by the user 102, or the payment server 112 may be configured to get the product related information from an external server by sending the plurality of products to the external server such as the acquirer server 118 or the issuer server 116 or a third-party server.

In another alternate embodiment, the payment request to purchase a plurality of products may be received by the payment server 112, from the merchant terminal 108. The payment request may only include the plurality of products and the quantity associated with each product selected by the user for purchase. The merchant terminal 108 may send the payment request to an external server such as an acquirer server 118 to determine products related information based on the plurality of products and the quantity associated with each product, for which the payment request is received. The external server may be configured to send the products related information to the payment server 112.

Further, in one example embodiment, the payment server 112 may perform a prior verification by checking for already available information regarding at least one general attribute of the plurality of attributes in one or more databases 114 stored against the identifier associated with the user (e.g., a phone number of the user) that is present in the payment request by applying a set of pre-defined rules. For example, the databases 114 may be external databases including regulatory database, a digital ID database, or an order history database. The payment server 112 may check for already available information in the one or more databases and perform a prior verification of the general attributes if any information is available without needing any extra input from the user 102. For example, the regulatory provider may include an identity of the user 102 that has a date of birth, and the payment server 112 may automatically verify the age attribute of the user 102 from the already available information. Further, the payment server 112 may still need an occupation attribute verification to process the payment. Here, both age and occupation attributes are user-specific attributes, but the age attribute may be treated as general attribute because the information regarding the age of the user 102 was already stored in one of the databases 114. In an alternate embodiment, the databases 114 may be within the payment server 112.

The one or more databases 114 may be directly accessed by the payment server 112 or in an alternate embodiment, the databases 114 may be accessed by the payment server 112 via one or more external server systems such as a centralized digital identity (ID) server. The external server system may be configured to communicate with the databases configured to store a plurality of documents and details associated with the plurality of users. The plurality of documents and details may be used to authenticate a user for any services. The documents and details stored in a database in the digital ID server may be government IDs, personal IDs, and details stored by the user by registering authorities or server systems configured to store the databases. When the databases are directly accessible, the payment server 112 may retrieve the documents and details by directly querying the one or more databases 114. In the alternate embodiment, the payment server 112 may communicate with the one or more databases 114 through the one or more external server systems, and retrieve the documents and details required for the verification.

In the example embodiment, after the payment server 112 has verified the general attributes with already present information stored in the databases 114, the payment server 112 may generate a payment link that when accessed by the user 102, will direct the user 102 to a page where the user 102 can provide the user-specific information that are required by the payment server 112, as an input. In the example, the payment link may be generated to request an ID proof to verify the occupation of the user 102 that depicts that the user 102 is a health worker. In an embodiment, the payment server 112 is configured to transmit a signal including the payment link to the merchant terminal 108. The merchant terminal 108 may then forward the payment link to the user device 104 using the identifier associated with the user 102 via means such as short messaging service (SMS), MMS, email, instant messaging through Internet, or any other means.

In an alternate embodiment, the merchant terminal 108 may be configured to generate the payment link by itself and send the payment link directly to the user device 104 without the intervention of the payment server 112.

Further, in the example embodiment, after the user 102 receives the payment link on the user device 104, the user 102 may click on the link and the link may access a web page managed by the payment network 110 that will provide an interface to the user to provide at least one user-specific information regarding at least one user-specific attribute, as input. The user 102 may use the link to provide an ID number, or a picture of an ID card, etc., and send it to the payment server 112. In the example, the user 102 may be requested to provide an occupation ID and the user 102 may provide the same and send it to the payment server 112 using a 'submit' or 'send' option presented to the user 102 by the interface.

In an additional embodiment, the payment server 112 may request a biometric or a security question authentication from the user 102 before verifying the user-specific information provided by the user 102, to determine if the person who is utilizing the payment link to provide the information regarding the plurality of attributes is an authentic person that is the holder of the identity proof. In an example, the user 102 may be asked to provide a fingerprint authentication or a security question authentication on the user device 104 as soon as the user 102 accesses the payment link received from the merchant terminal 108.

In an example embodiment, the payment server 112 is configured to verify the user-specific information received from the user 102 by checking the information against the user related data stored in the one or more databases such as the databases 114. If the information is found to be authentic, the payment server 112 may further proceed to the payment processing step. The payment may be processed as per the Business as Usual (BAU) flow, i.e., issuer server 116, acquirer server 118, and payment server 112 processing the payment in the usual process flow format. If the payment is successfully completed, the payment confirmation message may be sent to the user device 104 from the payment server 112 or in some cases, from the issuer server 116.

The one or more databases 114 may be directly accessible by the payment server 112 or may be accessed via one or more external servers. The payment server 112 may directly retrieve the user-specific information by querying the one or more databases 114. In alternate embodiments, the one or more databases 114 may be accessed via one or more external servers. The external servers may belong to regulatory authorities, or third-party organizations responsible for managing digital identities of the users for providing online authentication to the users. Herein, the regulatory authority may represent any entity or government, semi-government and/or private body who can promulgate certain rules regarding sale of the products and/or service. The payment server 112 may communicate with the one or more servers for retrieving the user-specific information from the one or more databases 114, for authenticating the users.

Figure 2A:
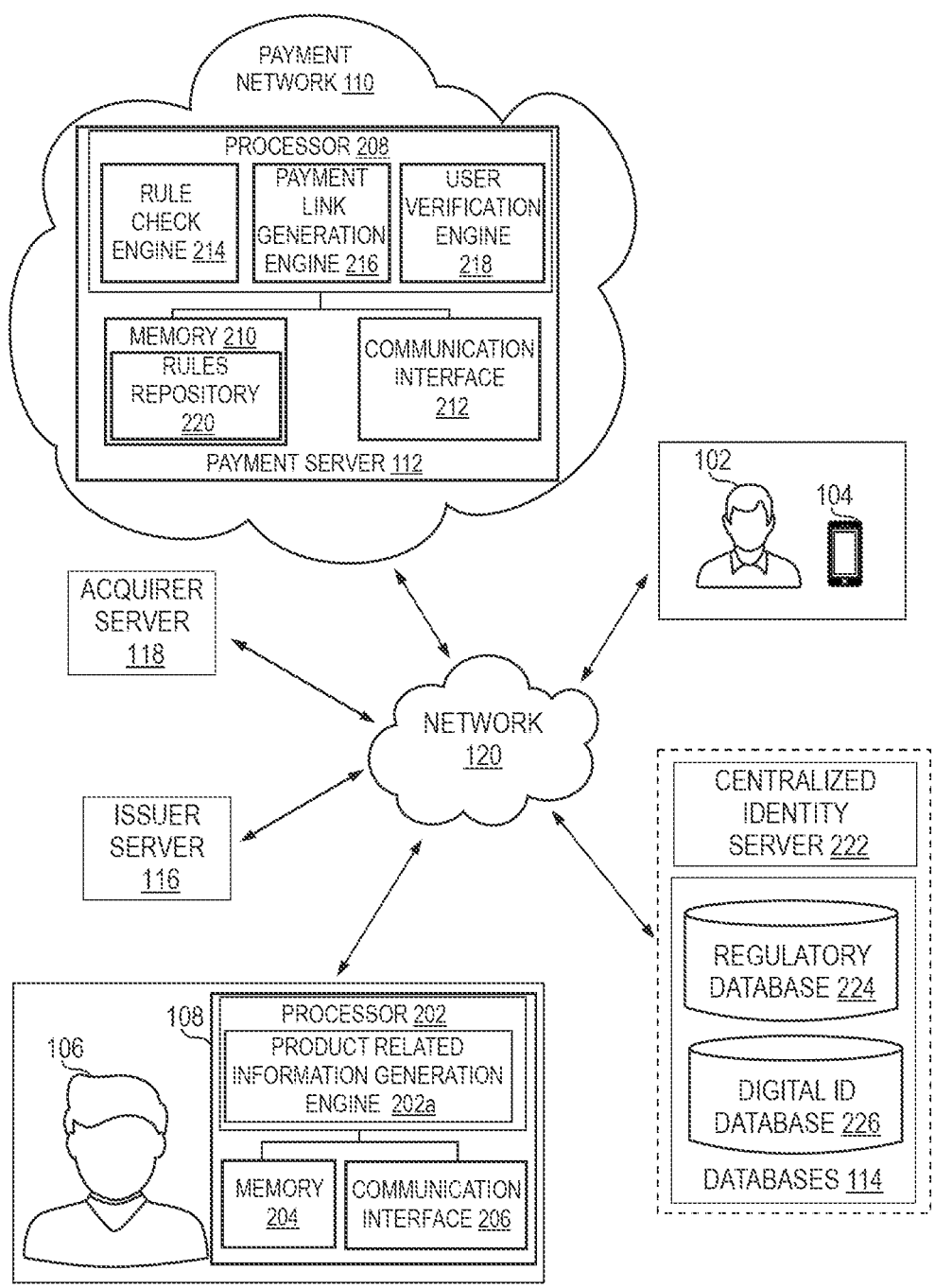
FIGS. 2A and 2B are block diagrams of payment server and merchant terminal, in accordance with some embodiments of the present disclosure.

FIG. 2A illustrates a simplified block diagram 200 including the user device 104, the merchant terminal 108, the payment server 112 associated with the payment network 110, an external server such as a centralized identity server 222, databases 114 including a regulatory database 224 and a digital ID database 226, the issuer server 116, the acquirer server 118 and the network 120, in accordance with an example embodiment. The merchant terminal 108 is shown including a processor 202, memory 204, and a communication interface 206. The processor 202 further includes a product related information generation engine 202*a*. The payment server 112 includes a plurality of components such as a processor 208, a memory 210, and a communication interface 212. The processor 208 may further include components such as a rule check engine 214, payment link generation engine 216, and a user verification engine 218. The memory 210 may include a rules repository 220. The payment server 112 may be facilitated in the payment network 110 which enables the payment server 112 to communicate with various components such as but not limited to the user device 104, the merchant terminal 108, and the issuer server 116.

This setup of components and server systems may be utilized to facilitate verification of electronic purchase of a user including a plurality of restricted products and payment processing for the corresponding purchase. The payment may be initiated from the merchant terminal 108. The merchant terminal 108 may be a POS terminal capable of providing a plurality of payment services such as card present transactions, card not present transactions, payment through a payment link, contactless payments, UPI payment, etc. The merchant terminal 108 is configured to receive input from the merchant 106 or the user 102 and facilitate payment transactions.

In an embodiment, the payment network 110 may facilitate merchant on-boarding to all the merchants who need to perform a plurality of attribute checks for a single order placed by a user over a phone call or an online order. Merchant on-boarding refers to the enrolment of each merchant and the restrictions and/or the criteria that will be applicable to the merchant as per the products sold by the merchant. The restrictions and criteria may be such as an occupation restriction on medical-related products such as an N95 mask or a high dosage drug that is only accessible by medical professionals, quantity restrictions such as a maximum of 50 ml of sanitizer per person, and the like. The payment server 112 stores such restrictions and/or criteria against the merchant. In some cases, the merchant may also provide information regarding the merchant restrictions and criteria to the payment server 112 along with a merchant ID and the POS ID, while registration. The merchant ID may be a unique identity given to the merchant 106 by the payment network 110 or the acquirer bank associated with a merchant account. Further, the POS ID may be another unique identity code provided to the merchant terminal 108 by the manufacturer of the device.

Further, in an embodiment, the regulatory authority of a particular locality or a third-party organization may impose certain restrictions and/or criteria on the sale of certain products to users. The restriction and criteria imposed by the regulatory authority may include order criteria such as an age restriction on tobacco and alcohol products, order quantity restriction such as a maximum of 5 lts or edible oil can be bought by one user within the time span of one month, etc. The payment server 112 may store the restrictions applicable to the merchant 106 against the merchant ID and the POS ID associated with the merchant 106, in a rules repository 220 of the memory 210. The tables and information fields stored in the rules repository 220 are shown and explained in detail in FIGS. 5A and 5B.

Further, in an example embodiment, the products on which a restriction is imposed by the regulatory authority or a third-party organization and the merchant 106, may be stored in the memory 204 of the merchant terminal as well. The merchant may manually store the restrictions, or the restrictions may be downloaded from the payment server 112 after the on-boarding process is completed through the network 120.

In an example embodiment, the user 102 may call the merchant 106 on a phone number associated with the merchant 106 through the user device 104. The user 102 may place an order including a plurality of products that the merchant provides and the quantity of each product in the plurality of products. For example, the user 102 may place an order as follows: ABC cigarettes Qty-2 Packs, GYC edible oil Qty-4 ltrs, N95 mask Qty-1, MCS sanitizer Qty-45 ml, and PQR wheat flour Qty-9 kg, wherein Qty refers to the quantity mentioned in the respective SI unit of the corresponding products.

In an example, when a user calls and places an order, the merchant 106 may manually input the products and their corresponding quantities to the merchant terminal 108. The merchant terminal 108 may have an I/O (input/output) interface that enables the merchant 106 to input the products and a database including all the products provided by the merchant that may be pre-loaded onto the merchant terminal 108. In an alternate embodiment, the order may be placed on a web page configured to facilitate the user 102 to select the products and the quantity of each product in the list of products and place an order that will be notified to the merchant 106. In the example, as the user has placed an order via a call, the merchant 106 may manually enter the products and the quantity corresponding to each product of the plurality of products.

In one embodiment, the product related information generation engine 202*a* present in the processor 202 of the merchant terminal 108 is configured to generate products related information associated with the plurality of products input by the merchant 106. The products related information may be a code or an identifier such as a Boolean code or an integer code that depicts the rule checks that have to be performed for the corresponding order out of all the rule checks that the merchant 106 is on-boarded for. For example, if the Boolean code of 1100 is given for an order, it depicts that two out of four rule checks that the merchant is on-boarded for have to be carried out for the corresponding order. In the example, the order may need all the rule checks that the merchant is on-boarded for, hence the products related information associated with the plurality of products in the order placed by the user may be 1111 since all the rule checks that the merchant is on-boarded for are present in the order i.e., age check, occupation check, quantity criteria check and location criteria check. In another example, if only two rule checks have to be performed for the list of products ordered by the user 102, then the products related information maybe 1001, 1010, 1100, 1010, 0011, 0101, or 0110 based on the rule checks that have to be performed for that particular order.

In another embodiment, there will be more than one code, and each code will represent presence of different combinations of product types and/or quantity of certain products as well. For instance, once the merchant selects a first product type and a quantity, a corresponding unique code (C1) is generated. Further, in the same order when the merchant selects a second product type with a corresponding quantity, a corresponding unique code (C2) is also generated. C1 and C2 are included in the payment request. In such embodiments, the products related information can be in the form of a string. The set of paired Boolean codes as discussed earlier may be utilized to generate products related information associated with the different types of products.

In an alternate embodiment, after the merchant 106 receives the order through a call or a web page, the merchant 106 may directly input the products related information associated with the plurality of products present in the purchase of the user 102. In an example, the purchase associated with the user 102 may include a plurality of products and quantities corresponding to each of the plurality of products. The plurality of products refers to a variety of product types such as, but not limited to, fruit, a beverage, an alcoholic drink, etc., present in a single purchase associated with the user 102. This process will reduce the work of inputting the plurality of products onto the merchant terminal 108 and then the merchant terminal 108 generating the products related information associated with the plurality of products. Further, in the example embodiment, merchant terminal 108 is configured to generate a payment request including the products related information associated with the plurality of products, merchant ID, POS ID, an identifier associated with the user 102 (e.g., a phone number of the user), and a plurality of products and the quantity associated with each product that needs a rule check. In the example, the payment request may include the products related information 1111, merchant ID associated with the merchant 106, POS ID associated with the merchant terminal 108, the phone number associated with the user 102 and all the products in the order placed by the user 102 since all the products in the order need a rule check.

In an example embodiment, after the payment server 112 receives the payment request from the merchant terminal 108, the rule check engine 214 of the processor 208 is configured to run rule checks on the payment request based on the products related information associated with the plurality of products. The rule check engine 214 may utilize the rules repository 220 to determine the plurality of attributes including general attributes and user-specific attributes that have to be verified for the user 102 in order to process the payment for the corresponding order. The rule check engine 214 may check the rules repository 220 against the merchant ID or the POS ID and apply a set of regulatory rules on the products related information to retrieve the rules that the merchant 106 is on-boarded for. Further, the regulatory authority defined rules and the manufacturer defined rules may also be retrieved from the rules repository 220, by applying the set of regulatory rules. Further, the rule check engine 214 may determine a plurality of attributes that have to be verified based on the application of a set of regulatory rules. In the example, the rule check engine may determine four attributes that have to be verified for the user 102 based on the products related information associated with the plurality of products, i.e., 1111. The rule check engine 214 may determine that the age attribute, occupation attribute, location attribute, and quantity attribute have to be verified for the user before processing the payment. In case if the products related information was 1100, then it would be determined that only two attributes, say age and occupation attributes have to be verified and the like.

In yet another alternate embodiment, the payment request received by the payment server 112 may only include the plurality of products and the quantity related to each of the plurality of products. The payment server 112 may be configured to generate the products related information based on the plurality of products and the quantity related to each of the products. In some embodiments, the merchant terminal may send the payment request including the plurality of products and the quantity related to each of the plurality of products to an external server such as the acquirer server 118, for generating the products related information. The external server may then send the products related information for the corresponding payment request to the payment server 112.

Further, the user verification engine 218 of the processor 208 may check the databases 114 such as the regulatory database 224, the digital ID database 226 by directly accessing the one or more databases 114, and an order history database (not shown in the FIGs) or by accessing the centralized identity server 222, for already available information regarding at least one general attribute of the plurality of attributes by applying a set of pre-defined rules. The regulatory database 224 and the digital ID database 226 may store documents associated with the users, the documents may be such as Aadhaar card, citizenship card, driver's license, ration card, etc. The order history database may store the previous purchases made by the user to different merchants including the time and date of the purchase, quantity of purchase, documents utilized to purchase, etc. The order history database may be utilized by the payment server 112 to check the at least one general attribute of the plurality of attributes such as the quantity attribute and verify the general attributes automatically without needing any information to be input from the user 102.

The databases 114 may be directly accessed by the payment server 112 or in an alternate embodiment, the databases 114 may be accessed by the payment server 112 via one or more external server systems such as the centralized identity server 222. The centralized identity server 222 may be configured to communicate with the regulatory database 224 and the digital ID database 226 configured to store a plurality of documents and details associated with the user 102. The plurality of documents and details may be used to authenticate the user 102 for any services. The documents and details stored in a database in the digital ID server may be government IDs, personal IDs, and details stored by the user 102 by registering to an authority or a third-party server. When the databases 114 are directly accessible, the payment server 112 may retrieve the documents and details related to the general attributes by directly querying the one or more databases 114. In the alternate embodiment, the payment server 112 may communicate with the centralized identity server 222 or any external server which in turn accesses the regulatory database 224 and the digital ID database 226, and retrieves the documents and details related to the general attributes for the verification. The centralized identity server 222 may then send the same to the payment server 112.

In the example, the user verification engine 218 of the processor 208 may check if any information regarding the age attribute, location attribute, address attribute or the quantity attribute is already present in the databases 114. In the example, the information regarding the age and quantity attributes may already be available in the databases. For the age attribute, a Driver's license may be utilized and the information regarding the quantity attribute may be retrieved from the order history database. The payment server 112 may automatically verify the general attributes whose information is already available in the databases. Hence, in the example, the user verification engine 218 of the processor 208 may verify the age and the quantity attribute based on the already available information.

Further, in the embodiment, the payment link generation engine 216 of the processor 208 is configured to generate a payment link and send it to the merchant terminal 108. The payment link may be an URL which when accessed by a user will facilitate the user to enter at least one user-specific information that the payment server 112 needs for verifying the user-specific attributes whose information were not already available in the databases. In the example, the payment server 112 needs information regarding the occupation and the address attributes. The payment server 112 may determine what identity document is required from the user to verify the corresponding attributes. Based on the documents required from the user, the payment server 112 may generate a payment link, using which the user will be directed to a web page that facilitates the user to input the required documents. A unique number or an image of the identity document may be provided by the user.

In an embodiment, the signal including the payment link may be transmitted to the merchant terminal 108 and the merchant terminal 108 may further forward the payment link to the user device 104 using the identifier i.e., the phone number associated with the user 102. The user may then access the payment link and enter the user-specific information that the payment server may need based on the requirements provided by the user in the payment link. The user may provide a unique ID number or upload an image of the document and send it to the payment server by clicking on a 'send' or 'submit' button displayed to the user on the web interface. In the example, the payment link may be "mc.network/MID-OM-001/order{1}/occupationID {1}/addressID {1}". When the user 102 accesses the link, the user 102 may be provided with an interface that will facilitate the user 102 to enter the occupation ID number and the address ID number. The occupation ID may correspond to an ID that confirms that the user is a health worker who is eligible to buy N95 mask which is in the products list and the address ID may be a ration card that confirms the address of the user 102 is within 10 km radius of the merchant establishment.

In an alternate embodiment, the user 102 may be given an option to upload a picture of the document instead of providing the ID numbers. The payment server may be configured to utilize computer vision technology and grasp the information from the images of the documents uploaded by the user. The user 102 may provide user-specific information and send it to the payment server 112.

In another embodiment, after the payment server 112 receives the user-specific information, the user verification engine 218 may retrieve some information from the already present documents and cross verify the user-specific information provided by the user 102. In an alternate embodiment computer vision and Machine Learning algorithms may be used to determine the authenticity of the document images using Neural networks, and text capture technology may also be used to capture the text information present in the images of the documents and verify the text using the databases such as the regulatory database 224, digital ID database 226, and order history database (Not shown in the figure) and the like.

In an embodiment, after the plurality of attributes is verified by the processor 208, the payment server 112 may proceed with the payment processing. The payment may be processed in the BAU format. The payment may be carried out in a normal pull payment flow. The payment may be carried out in the usual acquirer-payment network-issuer flow. The acquirer server 118 may send a request to the issuer server 116 through the payment server 112 associated with the payment network 110. The issuer server 116 may then authorize the payment and carry out an authentication of the user identity. If the user has sufficient funds and authenticates his/her identity, the payment will be successful and if any of the above is not satisfied, the payment may fail. A payment status message may be sent to the merchant terminal from the payment server 112 after the payment is completed. The merchant terminal 108 may then forward the payment status message to the user device 104.

In another example embodiment, before the user-specific information provided by the user 102 is verified, the payment server 112 may perform a biometric or a security question authentication of the user 102 to ensure safety. The biometric or security question authentication request may be sent to the user device 104 and the user 102 may have to authenticate his/her identity to proceed with the verification process. This process makes sure that the user 102 is the sole owner of the documents associated with the user-specific information provided to the payment server 112 via the payment link. In an alternate embodiment, the user 102 may be requested to make a biometric or security question authentication as soon as the user 102 opens the payment link to provide the user-specific information.

In another example, if any one of the plurality of attributes such as the general attributes and/or the user-specific attributes is not verified by the payment server 112, then the payment request is not proceeded for the payment process as per BAU format. For instance, in the above example, if it is determined from the order history database that the user has already bought the GYC edible oil of 2 lts or more within a month, the quantity criteria may not be met and the payment for that order may not be processed. The user may be requested to delete that product from the order or maybe requested to reduce the quantity to eligible quantity for the month. In another example, if at least one of the user-specific attributes such as the age attribute, is not verified by the user verification engine 218, the user 102 may be requested to delete the products associated with the age attribute from the purchase of the user 102. In another example, if any one of the plurality of attributes is not verified, the payment request may fail, and the payment may not be processed.

In an embodiment, when some of the attributes from the plurality of attributes are not verified and some are verified, the payment server 112 may process the payment for the products associated with the verified attributes and refund the amount for the products associated with the unverified attributes. Further, the payment server 112 may send the payment confirmation for the verified products and the reasons for the failure of payment for the unverified products to the merchant terminal 108. The merchant terminal 108 may then forward the same to the user device 104.

Figure 2B:
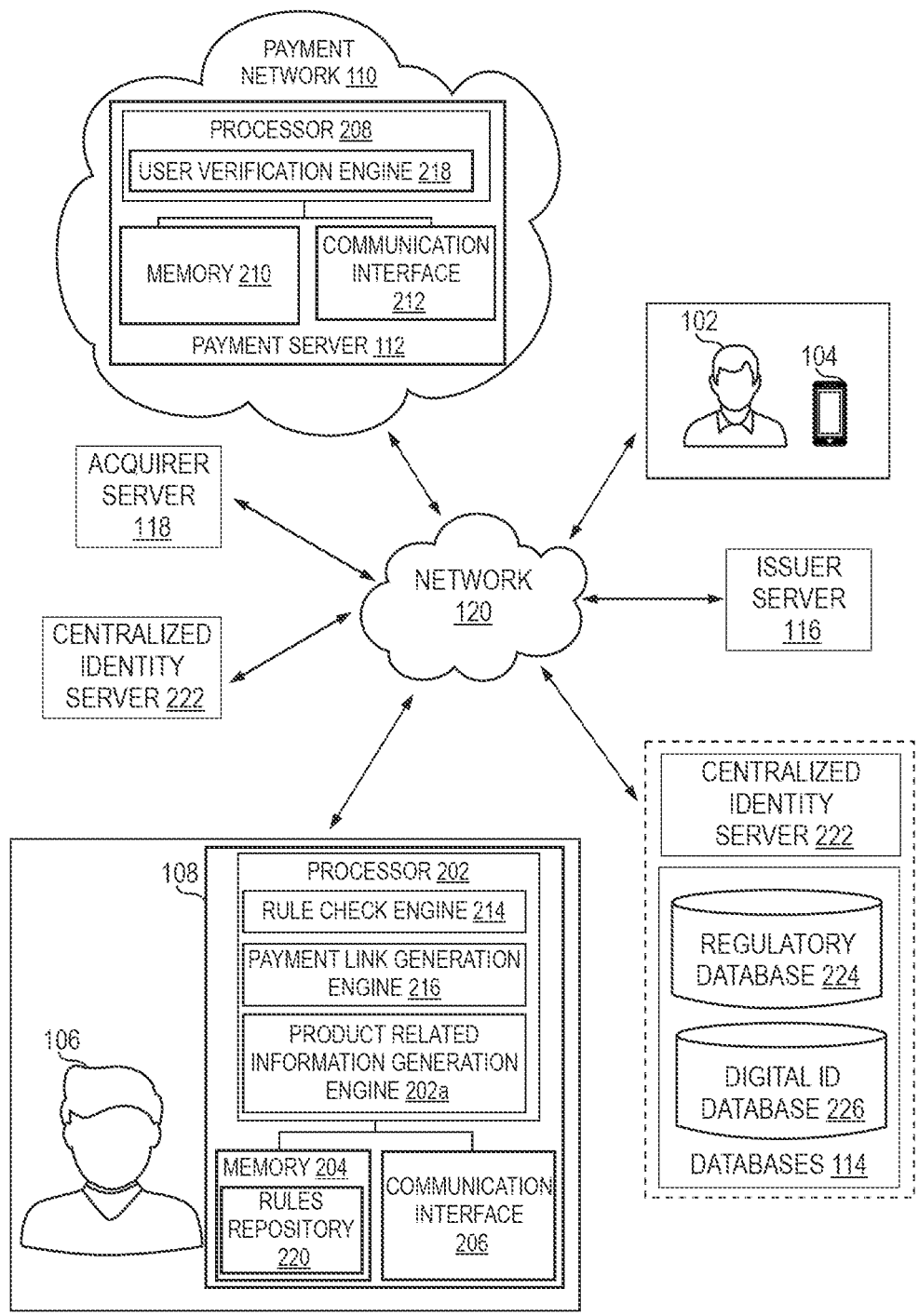

FIG. 2B is an illustration of a simplified block diagram 250 of an alternate embodiment of the present disclosure including the user device 104, the merchant terminal 108, the payment server 112 associated with the payment network 110, the centralized identity server 222, databases 114 including regulatory database 224 and digital ID database 226, the issuer server 116, the acquirer server 118 and the network 120, in accordance with an example embodiment. The merchant terminal 108 is shown including a processor 202, memory 204, and a communication interface 206. The processor 202 further includes a product related information generation engine 202*a*, the rule check engine 214, and the payment link generation engine 216. The memory 204 includes a rules repository 220. The payment server 112 includes a plurality of components such as a processor 208, a memory 210, and a communication interface 212. The processor 208 may further include a user verification engine 218. The payment server 112 may be facilitated in the payment network 110 which enables the payment server 112 to communicate with various components such as but not limited to the user device 104, the merchant terminal 108, and the issuer server 116.

All the components perform the exact same operations as discussed in FIG. 2A. The rule check engine 214 and the payment link generation engine 216 are present in the processor 202 of the merchant terminal 108 itself. The rules repository is also present in the memory 204 of the merchant terminal 108. This setup of components allows the merchant terminal itself to run rule checks and generate a payment link and send the payment link to the user. However, prior verification may not happen in the process, as the user verification engine 218 is present in the payment server and the payment network is responsible for the verification. Hence, the payment link generated by the merchant terminal in alternate embodiments may contain fields that provide an interface to the user 102 to input all the information associated with the plurality of attributes that have to be verified. The merchant terminal may send the information to the payment server 112 for the verification process.

Figure 3:
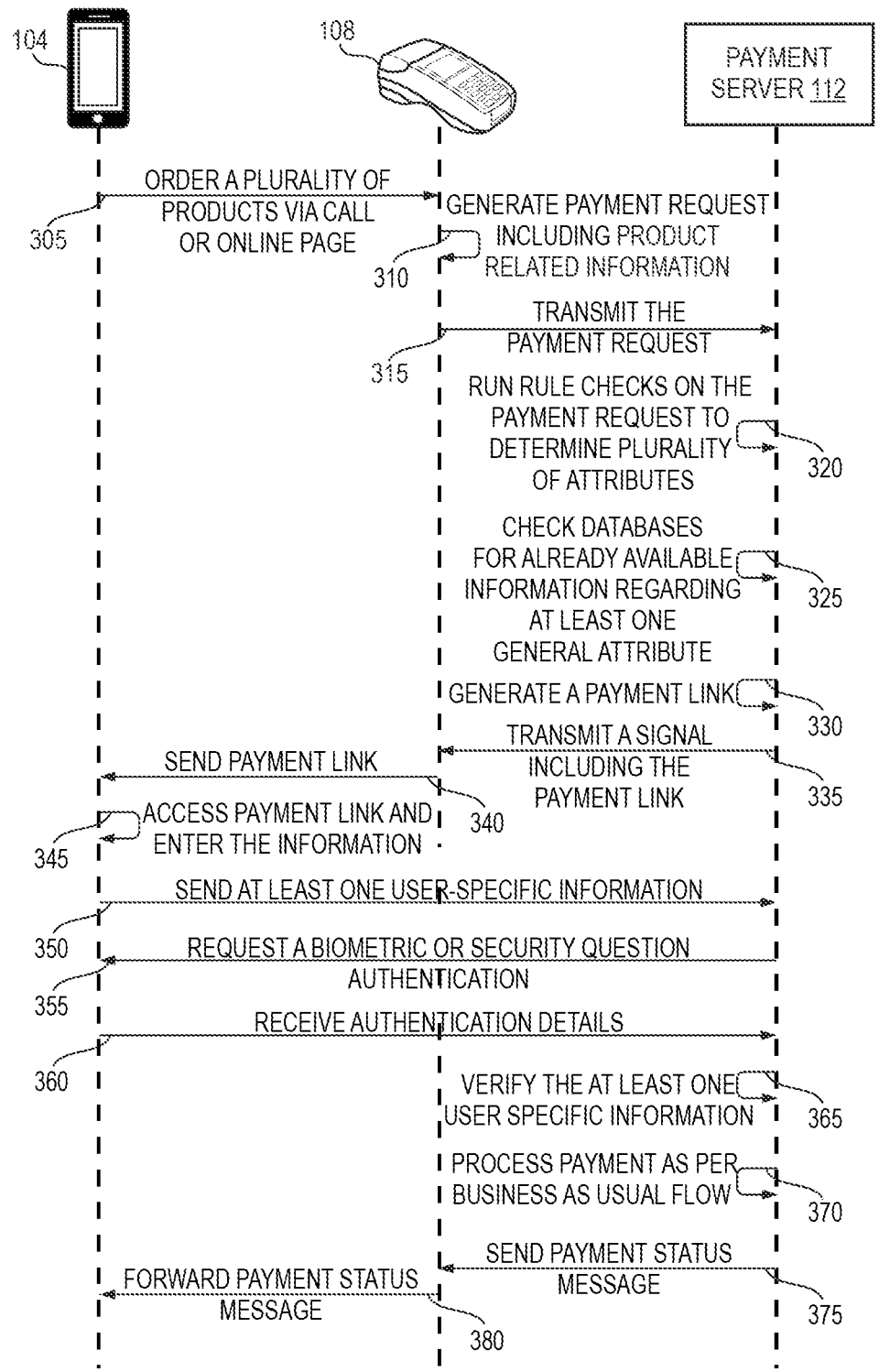
FIG. 3 is a sequence flow diagram for verifying a plurality of user attributes corresponding to a plurality of products included in a purchase of the user.

Turning now to FIG. 3, a sequence flow diagram 300 for facilitating the verification of plurality of attributes for an order placed by the user 102, is shown, in accordance with an example embodiment. The sequence of operations of the sequence flow diagram 300 may not be necessarily executed in the same order as they are presented. Further, one or more operations may be grouped together and performed in the form of a single step, or one operation may have several sub-steps that may be performed in parallel or in a sequential manner.

At 305, the user 102 may place an order (i.e., user request) to purchase a plurality of products from the merchant 106 using the user device 104. The user 102 may place an order via a call or a web page that is set up to place orders to the merchant 106. The purchase of the user 102 may include a plurality of products and a quantity associated with each of the plurality of products in the purchase. The merchant 106 may input the order to the merchant terminal 108.

At 310, after the merchant 106 has input products and the quantity associated with the products on the merchant terminal, the merchant terminal 108 is configured to generate a payment request including products related information associated with the plurality of products present in the order placed by the user 102. The payment request may include the products related information, merchant ID, an identifier associated with the user 102 (e.g., a phone number of the user), and the POS ID. In an alternate embodiment, the merchant terminal 108 may send only the plurality of products and the quantity related to each of the plurality of products to the payment server 112. The payment server 112 may then generate the products related information on its own or send the plurality of products and their quantities to an external server for the generation of products related information.

At 315, the merchant terminal 108 may be configured to transmit the payment request to the payment server 112.

At 320, the payment server 112 is configured to run rule check on the payment request received from the merchant terminal 108. The rule checks may be ran using a rules repository present in the payment server 112. The rules repository 220 of FIG. 2A may include rules and/or criteria defined by a plurality of merchants, the regulatory authority, and the manufacturers. The payment server 112 may determine the merchant rules for the corresponding order using the products related information and the merchant ID or the POS ID present in the payment request. The payment server 112 may determine the plurality of attributes including general attributes and the user-specific attributes to be verified for the user 102 to process the payment based on the rule check. The plurality of attributes may be an age attribute, order criteria restricting the quantity of buying a product, an occupation attribute, an address attribute, etc.

At 325, the payment server 112 may check databases such as the regulatory database 224, the digital ID database 226, and the order history database for already available information regarding the at least one general attribute from the plurality of attributes determined by the payment server 112 at 320. The payment server 112 may automatically verify the at least one general attribute whose associated information is already available in the databases 114 without needing any extra information from the user 102.

At 330, the payment server 112 may generate a payment link in order to retrieve user-specific information associated with the at least one user-specific attribute from the plurality of attributes from the user 102. The payment link when accessed may direct the user 102 to a web page managed by the payment server 112 and allow the user 102 to input the information associated with at least one user-specific attribute of the plurality of attributes. In an example, the payment link may be a URL that will direct the user to a web page associated with the payment server 112.

At 335, a signal including the payment link and the at least one user-specific attribute may be transmitted from the payment server 112 to the merchant terminal 108. Further, at 340, the merchant terminal 108 may further, send the payment link to the user device 104.

At 345, the user may open the payment link and then enter the required information regarding the at least one user-specific attribute that has to be verified. The user 102 may be directed to a webpage that facilitates the user 102 to input an ID number or a picture of the ID that may be used to verify at least one attribute that has to be verified. The user 102 may click on the link and input all the user-specific information that would be requested by the user 102. At 350, the user 102 may send at least one user-specific information related to at least one user-specific attribute to the payment server 112, from the user device 104. A 'send' or 'submit' button may be present in the webpage that facilitates the user 102 to send the information input by the user 102 to the payment server 112.

At 355, the payment server 112 may request a biometric or a security question authentication in order to verify that the user 102 who has provided the user-specific information regarding the user-specific attributes is an authentic person or not. At 360, the authentication details may be sent to the payment server 112 from the user device 104.

At 365, if the biometric authentication is successful by the payment server 112, the payment server 112 is configured to check and verify the at least one user-specific information regarding the user-specific attributes received from the user device 104 at 350. The verification is performed by verifying the user-specific information received from the user device 104 against the one or more databases such as the regulatory database 224 and/or the digital ID database 226. The information may be stored against the identifier associated with the user 102 i.e., the phone number of the user 102, and since the payment request includes the user 102's phone number, the payment server may check the databases against the same in order to verify the user-specific information.

At 370, upon successful verification, the payment server 112 may further process the payment as per BAU format. The payment request may be processed through the issuer server, payment server, and the acquirer server in the process defined in the art.

At 375, if the payment is successfully completed, a payment status message is sent to the merchant terminal 108 from the payment server 112. If the payment is successful, a successful payment message is sent to the merchant terminal 108 and if the payment is not successful, a payment failure message follows. At 380, the merchant terminal 108 may forward the payment status message from the merchant terminal 108 to the user device 104.

Figure 4:
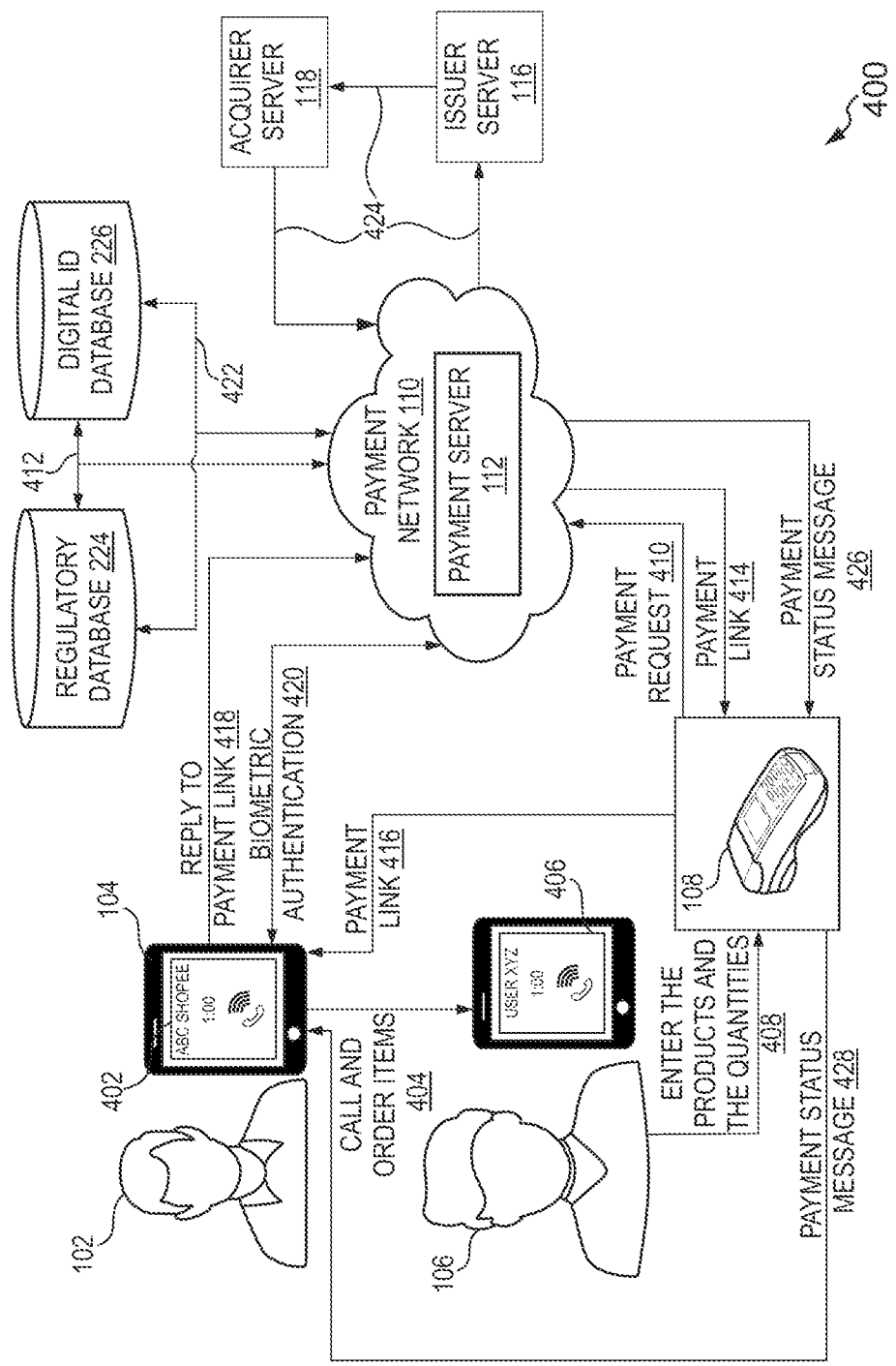
FIG. 4 illustrates a representation depicting a process flow of verifying plurality of user attributes for the electronic purchase of the user, in accordance with an example embodiment.

FIG. 4 represents an example representation 400 for verifying plurality of attributes associated with an order placed by a user 102 via a payment link generated by a payment server 112, in accordance with an example embodiment.

In one example implementation, the user 102 is calling a merchant 106 using user device 104. The user device 104 is exemplarily shown to display an interface 402 with a merchant name "ABC shoppee". At 404, the user 102 may call the merchant 106 and place an order to purchase a plurality of products. The purchase of the user 102 may include the plurality of products and the quantity associated with each of the plurality of products. It is exemplarily shown in the representation 400 that the merchant 106 has a phone and is receiving the call form the user. The phone of the merchant 106 is exemplarily shown to display a caller name "user XYZ" on the interface 406.

At 408, the merchant 106 may take note of the list of the plurality of products that are included in the purchase of the user 102 and may enter the plurality of products and the quantity associated with each of the plurality of products into the merchant terminal 108. The merchant terminal 108 may generate products related information associated with the plurality of products ordered by the user 102. The products related information may include codes or identifiers that depict the rule checks that have to be performed for the corresponding order based on the rule check that the merchant has on-boarded for. In an embodiment, the products related information may be a Boolean code that is used to depict the number of rule checks that have to be performed for an order, 1 depicting that a rule check has to be performed and 0 depicting otherwise. In an example, the merchant 106 may be on-boarded for 5 rule checks but an order from the user 102 needs only two rule checks. In this example, the products related information may look something like 10010.

At 410, the merchant terminal 108 transmits a payment request to the payment server 112 associated with the payment network 110. The payment request may include the products related information generated by the merchant terminal 108, a merchant ID, a POS ID, and an identifier associated with the user 102 which may be a phone number associated with the user 102. In some implementations, the payment request may also include the plurality of products and their quantities as ordered by the user 102.

The payment server 112 is configured to run rule checks on the payment request based on the products related information and determine the plurality of attributes that have to be verified by the payment server 112 before proceeding with the payment. The plurality of attributes including general attributes and user-specific attributes may be determined by running rule checks using rules repository present in the payment server 112. The rules repository may include criteria/rules defined by the merchant and the regulatory authority and may be utilized by the payment server 112 to determine which all attributes have to be verified before the payment is processed for the corresponding order placed by the user 102.

In an embodiment, after the payment server, 112 determines the plurality of attributes to be verified, the payment server 112 may check for already available information regarding at least one general attribute from the plurality of attributes in the databases such as the regulatory database 224, the digital ID database 226, and the order history database. At 412, the payment server 112 may check the databases for already available information regarding the at least one general attribute from the plurality of attributes that have to be verified.

In an embodiment, if the information is available regarding at least one general attribute of the plurality of attributes, the payment server 112 may verify the at least one general attribute whose information is already available without requiring any excess information from the user 102. After the payment server 112 checks for the already available information regarding the plurality of attributes at 412, the payment server is configured to generate a payment link. The payment link may be a URL that may be sent to the user 102. The URL when accessed by the user 102 will direct the user to a page where the user 102 will be able to input the user-specific information regarding at least one user-specific attribute out of the plurality of attributes whose information was not already available in the database.

At 414, the payment server 112 may transmit a signal including the payment link to the merchant terminal 108. At 416, the merchant terminal 108 may send the payment link to the user device 104 using the identifier (e.g., a phone number of the user) associated with the user 102.

At 418, the user 102 may send a reply to the payment server with the user-specific information regarding the at least one user-specific attribute that needs user-specific information for verification. The user-specific information may be an identification number or an image of an official document. The user-specific information is sent to the payment server 112 by accessing a 'send' or a 'submit' button presented to the user 102 on an interface that the user 102 will be directed to when the user accesses the payment link.

In an example implementation, the payment server 112 may request a biometric or a security question authentication from the user 102 before verifying the information related to the attributes for the user 102. This authentication determines that the person who is providing the user-specific information regarding the user-specific attributes is the user 102 himself/herself and no misuse of the official documents is happening. At 420, the biometric or a security question authentication is carried out between the payment server 112 and the user device 104.

If the authentication process at 420 is successful, the payment server 112 is configured to proceed with the verification process of the user-specific information received from the user device 104. At 422, the payment server 112 may verify the user-specific information by retrieving the user related data stored in the databases such as the regulatory database 224 and/or the digital ID database 226. If the user-specific information is successfully verified by the payment server 112, the payment request is further processed by the payment server 112 as per the BAU format.

At 424, the payment may be processed through the acquirer server 118, issuer server 116, and the payment server 112 associated with the payment network 110 as per the techniques defined in the art. The normal payment flow is followed in the BAU format for the payment processing and in some implementations, the user 102 may again validate his/her identity using the card PIN or an OTP as per the issuer or acquirer bank standards.

Further, based on the success or failure of the payment, at 426, a payment status message is sent to the merchant terminal 108, from the payment server 112. If the payment is successful, then a payment confirmation may be sent to the merchant terminal 108 and if the payment fails, the reason for the payment failure may be sent to the merchant terminal 108.

Further, at 428, the payment status message is forwarded from the merchant terminal 108 to the user device 104. In another implementation, if the user-specific information received from the user 102 is not verified by the payment server based on the user related data stored in the databases, the payment may fail and a payment failure may be sent to the merchant terminal 108 at that time itself and the merchant terminal 108 may forward the same to the user device 104.

Referring now to FIGS. 5A and 5B, they represent tables of structured data related to a plurality of rules defined by the merchant and the regulatory authority used for running rule checks on the payment requests using the products related information associated with the plurality of products in an order placed by the user 102. FIG. 5A represents a table 500 that may be used for simple rule checks such as, but not limited to, the age attribute, occupation attribute, etc. FIG. 5B represents another table 520 that may be used for a bit complex rule checks such as, but not limited to, the frequency of buying a product, the quantity of product, the address of the user, etc. The tables 500 and 520 may be stored in the rules repository 220 of the payment server 112 as shown in FIG. 2A.

In an example embodiment, the table 500 may include a plurality of information fields such as for example, a product name (see, 502), a rule type (see, 504), a required identity (see, 506), an identity attribute (see, 508), a merchant ID (see, 510), and a POS ID (see 512). The product name 502 may be a product identifier that is given by the merchant or the regulatory authority for each product. The rule type 504 represents the type of rule that applies to the corresponding product name. The rule type may be either merchant restriction or a regulatory authority restriction. Further, the required identity 506 represents a field that depicts which identity may be used to verify the applied rule on the product. One or more identities may be used to verify a rule, so this information field may include more than one element under the same column and row. The identity attribute 508 represents the attribute that has to be checked for the product with the corresponding rule imposed on the product. The attributes may include an identity card number, an age, an occupation ID, and the like. Further, the merchant ID 510 and the POS ID 512 may be used for mapping the merchants or the merchant terminals from the payment request received by the payment server 112.

In one example, the product name is "MCS Sanitizer" and it has a rule type of "merchant restriction" depicting that the restriction for the corresponding product is imposed by the merchant. The required identity may be an "Aadhaar card" and the identity attribute is "Aadhaar number" depicting that the Aadhaar card has to be provided by the user 102 and the Aadhaar number has to be checked for the verification. The merchant ID may be "MID-0M-001" related to the merchant 106. The POS ID is shown to be "PS-0M-1-MP-P-01". It should be noted that merchant ID and the POS ID are unique and may be associated with a single merchant and a single merchant terminal, respectively.

Similarly in another example, the product name is "ABC cigarettes" and it has a rule type of "Government restriction" depicting that the restriction for the corresponding product is imposed by the Government or a regulatory authority. The required identity may be one of an "Aadhaar card", or a "passport", or a "driver's license (DL)" and the identity attribute is "age" depicting that the Aadhaar card or the passport or the DL has to be provided by the user 102 and the age has to be checked for the verification. The merchant ID may be "MID-0M-001" related to the merchant 106. The POS ID is shown to be "PS-0M-1-MP-P-01".

In another example embodiment, the table 520 may include a plurality of information fields such as for example, product name (see, 522), a rule type (see, 524), an order restriction (see, 526), a frequency (see, 528), a required identity (see, 530), an identity attribute (see 532), a merchant ID (see, 534), and a POS ID (see, 536). The product name 522 may be a product identifier that is given by the merchant or the regulatory authority for each product. The rule type 524 represents the type of rule that applies to the corresponding product name. The rule type may be either merchant restriction or a regulatory authority restriction. Further, the order restriction 526 represents an order restriction such as, but not limited to, a quantity or a location restriction that is imposed on the corresponding product. The frequency 528 represents the time restriction associated with the order restriction imposed on the corresponding product. The order restriction may restart after each frequency cycle is complete, the frequency may be defined by the merchant, or the regulatory authority and it may be a week, 15 days, a month, and the like. Further, the required identity 530 represents a field that depicts which identity may be used to verify the applied rule on the product. One or more identities may be used to verify a rule, so this information field may include more than one element under the same column and row. The identity attribute 532 represents the attribute that has to be checked for the product with the corresponding rule imposed on the product. The attributes may include an identity card number, an age, an occupation ID, and the like. Further, the merchant ID 534 and the POS ID 536 may be used for mapping the merchants or the merchant terminals from the payment request received by the payment server 112.

In one example, the product name is "GYG Edible oil" and it has a rule type of "merchant restriction" depicting that the restriction for the corresponding product is imposed by the merchant. The order restriction on GYC edible oil may be a maximum of 5 Litres and the frequency for the same is shown to be 1 month. This depicts that a maximum of 5 Litres of GYC edible oil can be bought by the user in the span of 1 month. Further, the required identity may be a "Ration card" and the identity attribute is "Ration card number" depicting that the Ration card has to be provided by the user 102 and the Ration card number has to be checked for the verification along with a frequency of buying for the corresponding product against the Ration card number provided by the user. The merchant ID may be "MID-0M-001" related to a merchant such as the merchant 106. The POS ID is shown to be "PS-0M-1-MP-P-01" related to a merchant terminal such as the merchant terminal 108. It should be noted that merchant ID and the POS ID are unique and may be associated with a single merchant and a single merchant terminal, respectively.

Similarly in another example, the product name is "PQR Wheat flour" and it has a rule type of "Merchant restriction" depicting that the restriction for the corresponding product is imposed by the merchant. The order restriction on PQR wheat flour may be a maximum of 10 kg and the frequency for the same is shown to be 1 month. This depicts that a maximum of 10 kg of PQR wheat flour can be bought by the user in the span of 1 month. Further, the required identity may be a "Ration card" and the identity attribute is "Address<10 km radius" depicting that the location of the user has to be within 10 km radius of the location of the merchant, along with a frequency of buying for the corresponding product against the Ration card number provided by the user. The ZIP code or the PIN code of the users' address may be verified for the corresponding product for verification. The merchant ID may be "MID-0M-001" related to a merchant such as the merchant 106. The POS ID is shown to be "PS-0M-1-MP-P-01" related to a merchant terminal such as the merchant terminal 108. It should be noted that merchant ID and the POS ID are unique and may be associated with a single merchant and a single merchant terminal, respectively.

In an example embodiment, one table such as the table 500 or 520 may be stored in the rules repository of the payment server 112 for each merchant segregated based on the merchant ID or the POS ID.

Figure 6:
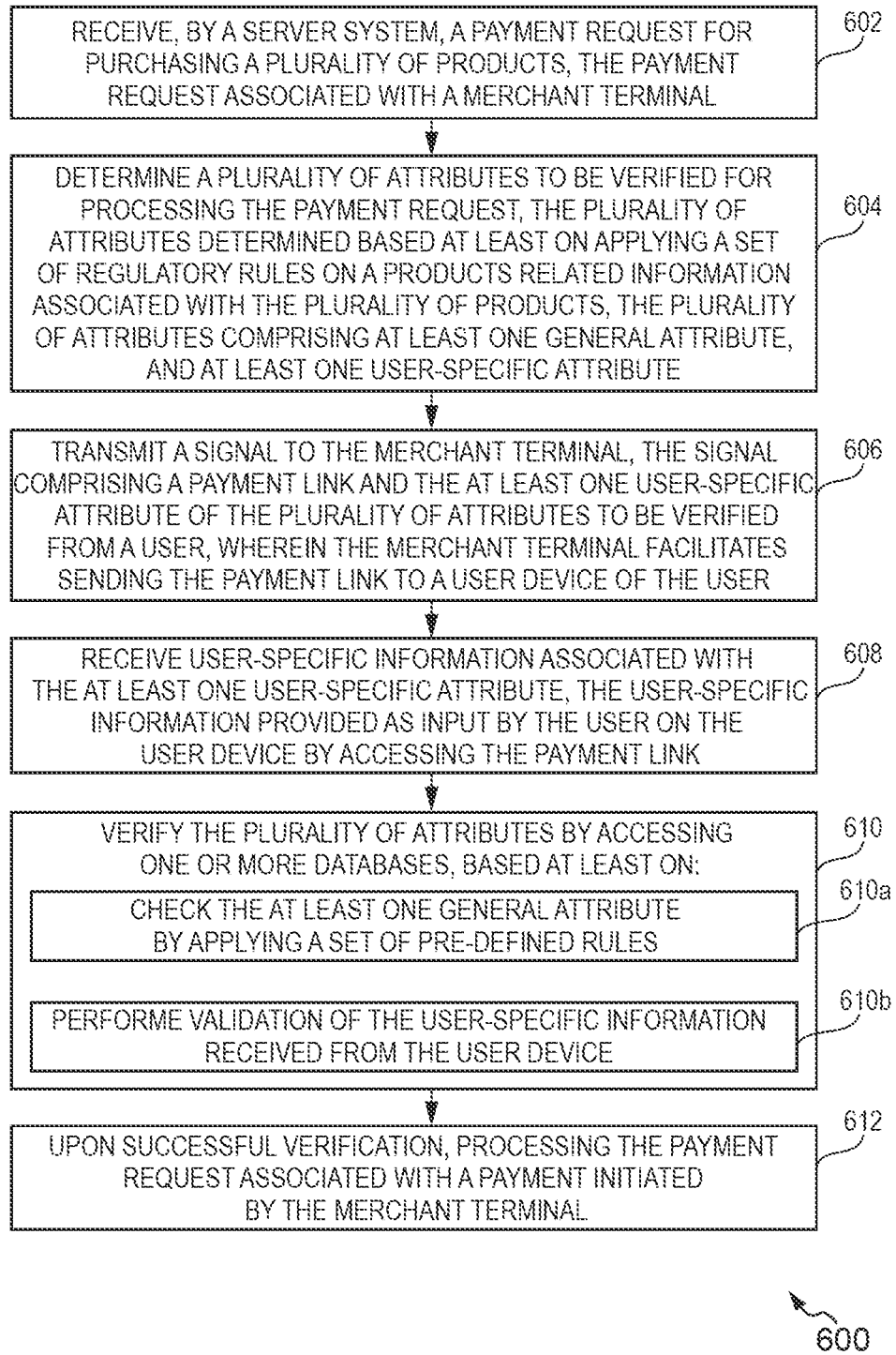
FIG. 6 illustrates a flow diagram of a method for verifying electronic purchases including restricted products and payment processing thereof, in accordance with an example embodiment.

Referring now to FIG. 6, a flow diagram of a method 600 for facilitating verification of plurality of attributes for a purchase of the user 102 is illustrated, in accordance with an example embodiment. The method 600 depicted in the flow diagram may be executed by, for example, a server system such as the payment server 112 associated with the payment network 110. Operations of the method 600, and combinations of operation in the method 600, may be implemented by, for example, hardware, firmware, a processor, circuitry, and/or a different device associated with the execution of software that includes one or more computer program instructions. The method 600 starts at operation 602.

At 602, the method 600 includes, receiving, by a payment server 112, a payment request including products related information of a plurality of products in a purchase of a user 102. The payment request may be associated with a merchant terminal 108. The payment request may also include merchant ID, POS ID, an identifier (e.g., a phone number of the user) associated with the user 102, and a plurality of products ordered by the user 102.

At 604, the method 600 includes, determining a plurality of attributes to be verified for processing the payment request. The plurality of attributes may be determined based at least on applying a set of regulatory rules on the products related information. The plurality of attributes may include at least one general attribute and at least one user-specific attribute. The plurality of attributes may be an age attribute, occupation attribute, quantity attribute, etc.

At 606, the method 600 includes, transmitting a signal to the merchant terminal 108. The signal may include a payment link and at least one user-specific attribute of the plurality of attributes to be verified from the user 102. Further, the merchant terminal 108 facilitates sending the payment link to a user device 104 of the user 102.

At 608, the method 600 includes, receiving user-specific information associated with the at least one user-specific attribute. The user-specific information is input by the user 102 on the user device 104 by accessing the payment link.

At 610, the method 600 includes, verifying the plurality of attributes by accessing one or more databases 114. The verification step 610 further includes two processes, namely, checking at least one general attribute and validating at least one user-specific information. At 610*a* the verification step includes, checking the at least one general attribute by applying a set of pre-defined rules. At 610*b*, the verification step includes, performing validation of the user-specific information received from the user device 104.

Upon successful verification, at 612, the method 600 includes, processing the payment request associated with the payment initiated by the merchant terminal 108. The payment may be processed as per the BAU format.

Figure 7:
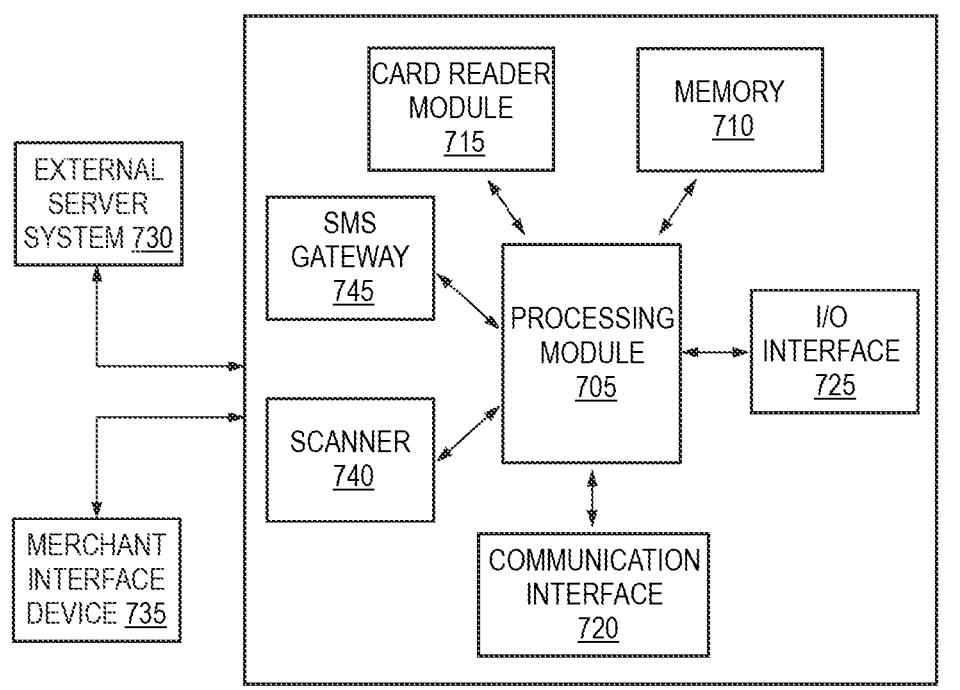
FIG. 7 is a simplified block diagram of a merchant terminal, in accordance with one embodiment of the present disclosure.

FIG. 7 is a simplified block diagram of a merchant terminal 700, for example, a Point of sale (POS) terminal that may be used to implement various processes, in accordance with an embodiment of the present disclosure. The merchant terminal 700 may refer to a system including a host computer connected to several peripheral devices, such as a keyboard, and a mouse, a card reader, a barcode scanner, a receipt printer, a cash drawer, and a weighing scale. However, it shall be noted that herein the merchant terminal 700 is referred to a multipurpose POS machine that is capable of generating products related information, sending SMS, etc.

The merchant terminal 700 includes at least one processing module 705 communicably coupled to a memory 710, a card reader module 715, a communication interface 720, a scanner 740, and an SMS gateway 745. The components of the merchant terminal 700 provided herein may not be exhaustive, and the merchant terminal 700 may include more or fewer components than those depicted in FIG. 7. Further, the plurality of components may be embodied in one single component, and/or one component may be configured using multiple sub-components to achieve the desired functionalities. Some components of the merchant terminal 700 may be configured using hardware elements, software elements, firmware elements, and/or a combination thereof.

The card reader module 715 runs scripts such as or similar to EMV scripts (GET scripts) that allow reading of information from a chip of a payment card. The card reader module 715 is also configured to read information stored within magnetic stripes provided in some payment cards. There may be as many as two card reader modules in the merchant terminal 700 such that each of which may be configured to read information stored in different types of storages, such as chips and magnetic stripes.

An I/O interface 725 is configured to receive inputs from an end-user and provide outputs to the end-user (i.e., a merchant 106) of the merchant terminal 700. For instance, the I/O interface 725 may include at least one input interface and/or at least one output interface. Examples of the input interface may include but are not limited to, a keyboard, a keypad, a touch screen, soft keys, and the like. The input interface (also referred to as 'input module') may be used to provide transaction amount and PIN. The input interface may also be used to provide Card details or UPI details of a user to perform remote transactions when the user is not physically present at the merchant facility. Examples of the output interface may include but are not limited to, a UI display (such as a light-emitting diode display, a thin-film transistor (TFT) display, a liquid crystal display, an active-matrix organic light-emitting diode (AMOLED) display, etc.) and the like. The output interface may optionally display a notification depicting payment transaction status such as payment transaction approval or decline upon transferring the transaction amount to an acquirer account of the merchant.

The memory 710 can be any type of storage accessible to the processing module 705. For example, memory 710 may include volatile or non-volatile memories, or a combination thereof. In some non-limiting examples, the memory 710 can be four to sixty-four Megabytes (MB) of Dynamic Random-Access Memory ("DRAM") or Static Random-Access Memory ("SRAM"). In addition, some examples may include supplementary flash memory installed via a PCMCIA slot. Moreover, the memory 710 is capable of storing and/or retrieving data, such as, but not limited to, smart card insertions, user/customer information, merchant information, card swipes, touch-screen key depressions, keypad key depressions, number of dots printed by the slip and roll printers, check read errors, and the like. Such information can be accessed by the processing module 705 using the communication interface 720 to determine potential future failures and the like.

The merchant terminal 700 is capable of communicating with one or more peripheral devices such as a merchant interface device 735 and an external server system 730 such as the payment server 112 (shown in FIG. 1) via the communication interface 720 over a communication network (not shown). The merchant interface device 735 can provide functionality which is used by a user (e.g., the user 102) at a merchant facility, such as unique reference code (e.g., QR code) entry corresponding to the payment card of the cardholder, PIN entry, clear text entry, signature capture, and the like. The merchant terminal 700 includes a scanner 740 configured to read a machine-readable encrypted code such as the unique reference code that may be generated by the user device 104 for the payment card information. The scanner 740 may be a barcode scanner or a QR code scanner. The merchant interface device 735 may be connected to several peripheral devices including cash drawers, receipt printers, PIN pads, signature capture devices, and the like. In some embodiments, the merchant interface device 735 may be mounted near a cash register at a check-out counter at a merchant facility, while the merchant terminal 700 may be mounted on the check-out counter such that it is accessible to customers. In this way, both the merchant and the user/customer can interact with similar devices to process the payment transaction.

The SMS gateway 745 of the merchant terminal 700 is configured to send SMS to the user device using a phone number associated with the user or send broadcast messages to a plurality of users at once. The SMS gateway 745 may send payment links, payment confirmation messages, etc., in the form of SMS. In another example embodiment, the SMS gateway 745 can also be used to provide information to a plurality of users regarding any important updates or offers that the merchant may be introducing.

In one embodiment, the communication interface 720 includes a transceiver for wirelessly communicating information (transaction amount, merchant identifier, etc.) to, or receiving information from, the external server system 730 or other suitable display devices, and/or another type of remote processing device. In another embodiment, the communication interface 720 is capable of facilitating operative communication with the remote devices and a cloud server using Application Program Interface (API) calls. The communication may be achieved over a communication network.

The processing module 705 is capable of sending the payment transaction request received from the end-user via the communication interface 720 to the external server system 730 (e.g., payment server 112) for processing the payment transaction. For example, the processing module 705 is configured to generate products related information associated with a plurality of products that a user may have ordered. The list of products may be provided to the merchant terminal 700, by the merchant manually. The processing module 705 is configured to identify whether a product in the list of products needs a rule check or not. A table of product restrictions and order restrictions may be stored in the memory 710 of the merchant terminal 700. The processing module 705 is configured to generate the payment transaction request. The processing module 705 can access the memory 710 to retrieve the merchant information of the merchant such as, merchant identifier merchant account details that are required to be sent along with the payment transaction request to the external server system 730. The processing module 705 is configured to receive a payment status message from the external server system 730 (e.g., payment server 112 or the acquirer server 118), when a payment transaction associated with the payment transaction request is successfully completed.

Additionally, the merchant terminal 700 can include an operating system and various software applications that can provide various functionalities to the merchant terminal 700. For example, in some embodiments, the merchant terminal 700 is addressable with an Internet protocol and includes an application. In such embodiments, the processing module 705 includes software adapted to support such functionality. In some embodiments, the processing module 705 executes software to support network management. In particular, this capacity allows the software to be downloaded to a plurality of such systems to provide new applications such as application for various possible payment methods using POS terminals and/or updates to existing applications. The operating system and software application upgrades are distributed and maintained through communication to the merchant terminal 700 over the payment network 110.

Figure 8:
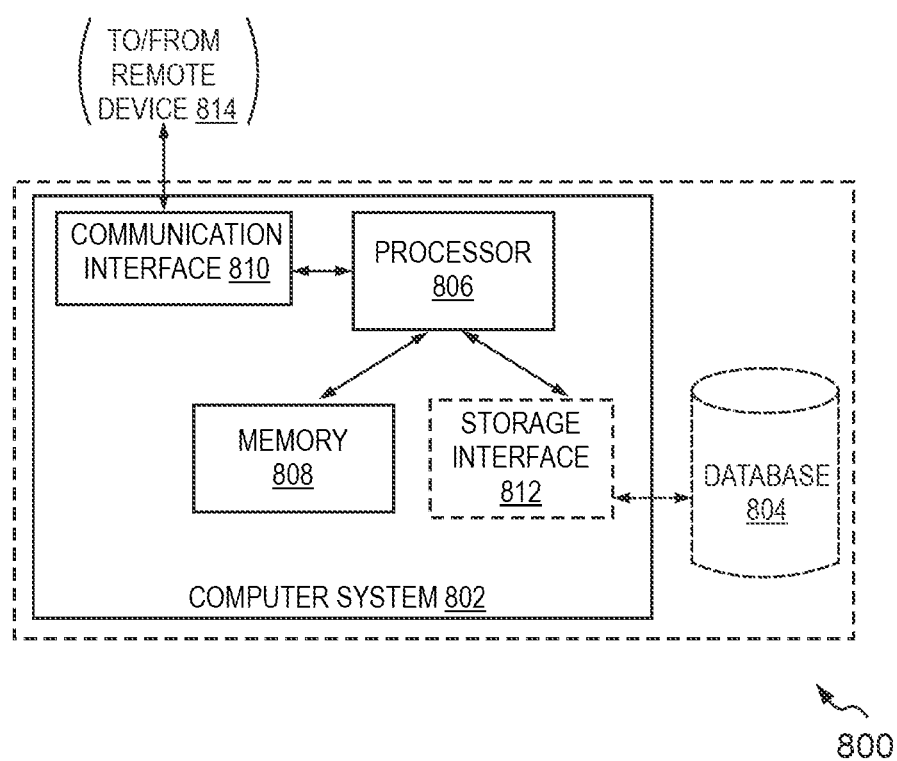
FIG. 8 is a simplified block diagram of a computer system, in accordance with one embodiment of the present disclosure.

FIG. 8 is a simplified block diagram of a system 800 for performing verification of plurality of attributes of a user, in accordance with an embodiment of the present disclosure. The system 800 is an example of a system (e.g., the payment server 112). The system 800 includes a computer system 802 and a database 804. In an embodiment, the system 800 is integrated in the payment server 112.

The computer system 802 includes at least one processor 806 configured to execute executable instructions for providing various features of the present disclosure. The executing instructions are stored in a memory 808. The components of the computer system 802 provided herein may not be exhaustive and the computer system 802 may include more or fewer components than those depicted in FIG. 8. Further, the plurality of components may be embodied in one single component, and/or one component may be configured using multiple sub-components to achieve the desired functionalities. Some components of the computer system 802 may be configured using hardware elements, software elements, firmware elements, and/or a combination thereof.

The processor 806 is operatively coupled to a communication interface 810 such that the computer system 802 is capable of communicating with a remote device 814 such as a user device 104, the merchant terminal 108, the issuer server 116 or communicating with any entity connected to the network 120 (shown in FIG. 1) or any constituents of the payment network 110. In an embodiment, the communication interface 810 is configured to receive a payment request from a merchant terminal 108 (e.g., merchant terminal 108). The communication interface 810 is configured to determine the plurality of attributes that have to be verified for the user 102 using the payment request. Further, the processor 806 may generate a payment link based on the plurality of attributes that have to be verified for the user. The communication interface 810 may receive information regarding the plurality of attributes from the remote device 814. The communication interface 810 may further provide the information to the processor 806 and the processor 806 may verify the information based on the user related data stored in the database 804. The processor 806 may then process the payment in the BAU format.

The processor 806 may also be operatively coupled to the database 804. The database 804 is any computer-operated hardware suitable for storing and retrieving data, such as but not limited to, information of the user 102, information of the merchant 106, rules defined by a plurality of merchants, regulatory authority, or a third-party organization. The database 804 may also store information related to a plurality of bank accounts of users. Each user account data includes at least one of a username, a user address, an account number, MPIN, and other account identifier. The database 804 may also include instructions for settling transactions including merchant bank account information. The database 804 may include multiple storage units such as hard disks and/or solid-state disks in a redundant array of inexpensive disks (RAID) configuration. The database 804 may include a storage area network (SAN) and/or a network attached storage (NAS) system.

In some embodiments, the database 804 is integrated within computer system 802. For example, computer system 802 may include one or more hard disk drives as the database 804. In other embodiments, the database 804 is external to the computer system 802 and may be accessed by the computer system 802 using a storage interface 812. The storage interface 812 is any component capable of providing the processor 806 with access to the database 804. The storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 806 with access to the database 804.

Figure 9:
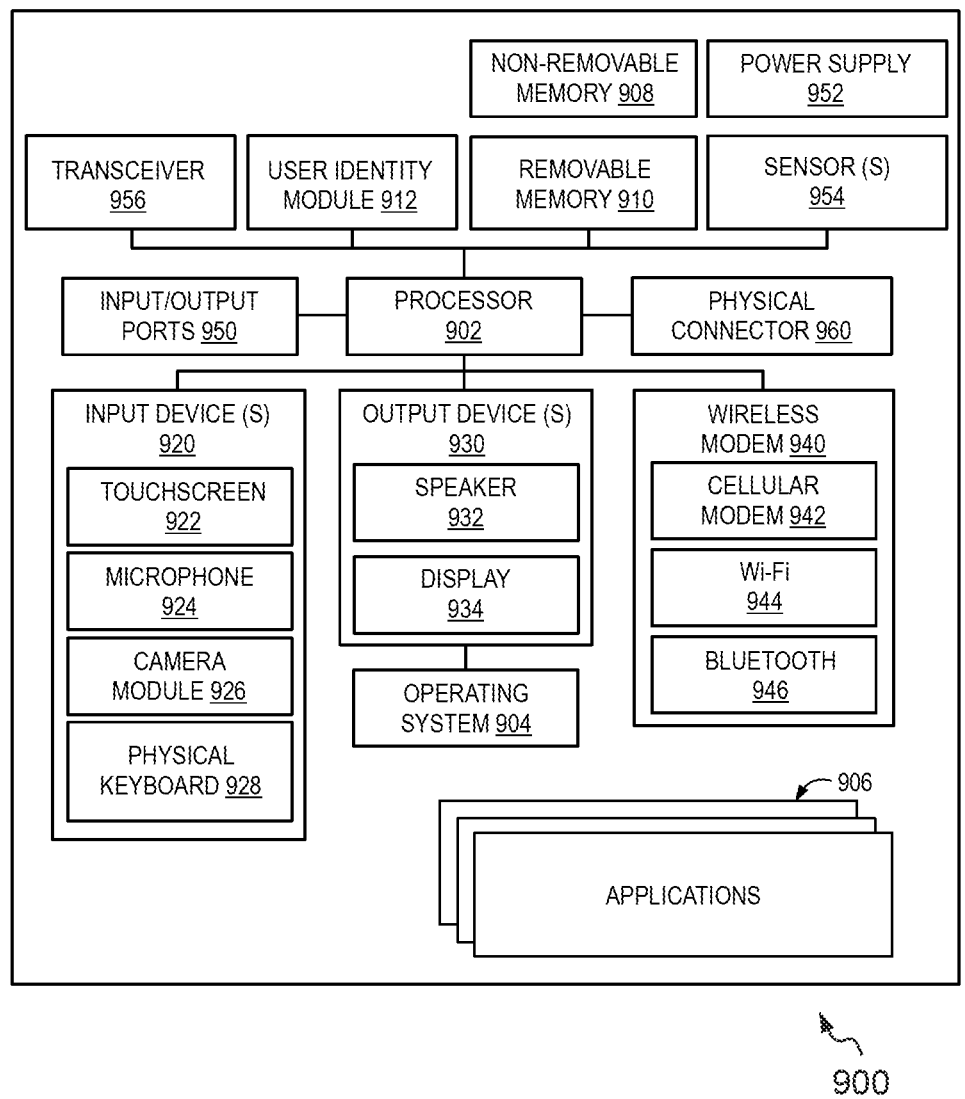
FIG. 9 is a simplified block diagram of a device, for example, a user device capable of implementing the various embodiments of the present disclosure.

FIG. 9 is a simplified block diagram of a user device 900 for example a mobile phone or a desktop computer capable of implementing the various embodiments of the present disclosure. For example, the user device 900 may correspond to the user device 104 of FIG. 1. The user device 104 has been shown in a simplified way in FIG. 1.

It should be understood that the user device 900 as illustrated and hereinafter described is merely illustrative of one type of device and should not be taken to limit the scope of the embodiments. As such, it should be appreciated that at least some of the components described below in connection with the user device 900 may be optional and thus in an example embodiment may include more, less, or different components than those described in connection with the example embodiment of the FIG. 9. As such, among other examples, the user device 900 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the user device 900 and supports for one or more payment transaction applications programs (see, the applications 906) such as the payment gateway application, that may be used to make an online payment using card details or UPI ID. In addition to the payment gateway application, the applications 906 may include common mobile computing applications (e.g., telephony applications, email applications, calendars, contact managers, web browsers, messaging applications, or any other computing application).

The illustrated user device 900 includes one or more memory components, for example, a non-removable memory 908 and/or removable memory 910. The non-removable memory 908 and/or the removable memory 910 may be collectively known as a database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the applications 906. The user device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSMC) communication systems, Code Division Multiple Access (CDMA) systems, or with third generation (3G) wireless communication protocols such as Universal Mobile Telecommunications System (UMTS), CDMA9000, wideband CDMA (WCDMA) and time division-synchronous CDMA (TD-SCDMA), or with fourth generation (4G) wireless communication protocols such as LTE (Long-Term Evolution).

The user device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922, and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the user device, 900 and a public switched telephone network (PSTN).

The user device 900 can further include one or more input/output ports 950, a power supply 952, one or more sensors 954 for example, an accelerometer, a gyroscope, a compass, or an infrared proximity sensor for detecting the orientation or motion of the user device 900 and biometric sensors for scanning biometric identity of an authorized user, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, payment server 112, merchant terminal 108, issuer server 116 and acquirer server 118 and their various components such as the processor 208, memory 210 and the like may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:
  receiving, by a server system, a payment request for purchasing a plurality of products, the payment request associated with a merchant terminal;
  determining a plurality of attributes to be verified for processing the payment request, the plurality of attributes determined based at least on applying a set of regulatory rules on a products-related information associated with the plurality of products, the plurality of attributes comprising at least one general attribute, and at least one user-specific attribute;
  transmitting a signal to the merchant terminal, the signal comprising a payment link and the at least one user-specific attribute of the plurality of attributes to be verified from a user, wherein the merchant terminal facilitates sending the payment link to a user device of the user;
  providing a web page accessed via activation of the payment link on the user device, the web page providing at least an interface to the user to input user-specific information regarding the at least one user-specific attribute, wherein:
  (1) the interface is configured to interactively authenticate an identity of the user, and (2) a type of interactive authentication is determined based on the plurality of attributes to be verified;

receiving the user-specific information associated with the at least one user-specific attribute, the user-specific information provided as input by the user on the user device by accessing the payment link;

verifying the plurality of attributes by accessing one or more databases, based at least on checking the at least one general attribute by applying a set of pre-defined rules, and performing verification of the user-specific information received from the user device by retrieving user-related data stored in the one or more databases;

determining that verification is successful; and processing the payment request associated with a payment initiated by the merchant terminal.

2. The method as claimed in claim 1, further comprising:

performing a prior verification, wherein the prior verification comprises checking if information associated with at least one general attribute of the plurality of attributes is already available in the one or more databases;

authenticating a user identity via one of a biometric authentication or a security question authentication; and generating, the payment link including at least one user-specific attribute for which the information is not already available.

3. The method as claimed in claim 1, further comprising:

generating, by the merchant terminal, the payment request in response to receipt of a user request to purchase the plurality of products;

sending, by the merchant terminal, the payment request comprising the products-related information to the server system;

receiving, by the merchant terminal, the payment link corresponding to the payment request for purchasing the plurality of products; and sending, by the merchant terminal, a short messaging service (SMS) comprising the payment link to the user device for making payment.

4. The method as claimed in claim 3, further comprising:

receiving an identifier associated with the user along with the payment request; and checking the one or more databases against the identifier for already available information associated with at least one of the plurality of attributes.

5. The method as claimed in claim 1, wherein applying the set of regulatory rules on the products-related information comprises running rule checks based on regulatory authority defined rules, merchant defined rules, and manufacturer defined rules stored in a rules repository.

6. The method as claimed in claim 5, wherein the rules repository comprises rules and criteria set by a plurality of merchants and a regulatory authority.

7. The method as claimed in claim 1, wherein checking the at least one general attribute comprises checking historical purchase data of the user in a pre-defined time period from the one or more databases.

8. The method as claimed in claim 1, wherein the plurality of attributes comprises age of the user, occupation of the user, location of the user or a merchant, and buying frequency of a product;

the interface uses computer vision technology to receive user-specific information regarding the at least one user-specific attribute from at least one image of at least one document uploaded by the user; and verifying further comprises using at least one of computer vision or machine learning algorithms to determine an authenticity of the at least one image of the at least one document uploaded by the user.

9. A server system, comprising:

a communication interface;

a memory comprising executable instructions; and a processor communicably coupled to the communication interface, the processor configured to execute the executable instructions stored in the memory and thereby cause the server system to perform at least in part to:

receive a payment request for purchasing a plurality of products, the payment request associated with a merchant terminal;

determine a plurality of attributes to be verified for processing the payment request, the plurality of attributes determined based at least on applying a set of regulatory rules on a products-related information associated with the plurality of products, the plurality of attributes comprising at least one general attribute, and at least one user-specific attribute;

transmit a signal to the merchant terminal, the signal comprising a payment link and the at least one user-specific attribute of the plurality of attributes to be verified from a user, wherein the merchant terminal facilitates sending the payment link to a user device of the user;

provide a web page accessed via activation of the payment link on the user device, the web page providing at least an interface to the user to input user-specific information regarding the at least one user-specific attribute, wherein:

(1) the interface is configured to interactively authenticate an identity of the user, and (2) a type of interactive authentication is determined based on the plurality of attributes to be verified;

receive the user-specific information associated with the at least one user-specific attribute, the user-specific information provided as input by the user on the user device by accessing the payment link;

verify the plurality of attributes by accessing one or more databases, based at least on checking the at least one general attribute by applying a set of pre-defined rules, and performing verification of the user-specific information received from the user device by retrieving user-related data stored in the one or more databases;

determine that verification is successful; and process the payment request associated with a payment initiated by the merchant terminal.

10. The server system as claimed in claim 9, wherein the executable instructions are further operative to cause the server system to:

perform a prior verification, wherein the prior verification comprises checking if information associated with at least one general attribute of the plurality of attributes is already available in the one or more databases;

authenticate a user identity via one of a biometric authentication or a security question authentication; and generate, the payment link including at least one user-specific attribute for which the information is not already available.

11. The server system as claimed in claim 9, wherein the executable instructions are further operative to cause the server system to:

generate, by the merchant terminal, the payment request in response to receipt of a user request to purchase the plurality of products;

send, by the merchant terminal, the payment request comprising the products-related information to the server system;

receive, by the merchant terminal, the payment link corresponding to the payment request for purchasing the plurality of products; and sending, by the merchant terminal, a short messaging service (SMS) comprising the payment link to the user device for making payment.

12. The server system as claimed in claim 11, wherein the executable instructions are further operative to cause the server system to:

receive an identifier associated with the user along with the payment request; and check the one or more databases against the identifier for already available information associated with at least one of the plurality of attributes.

13. The server system as claimed in claim 9, wherein applying the set of regulatory rules on the products-related information causes the server system to run rule checks based on regulatory authority defined rules, merchant defined rules, and manufacturer defined rules stored in a rules repository; and further wherein the verifying is completed by a payment server that is:

(a) integrated into the server system, and (b) configured to verify the plurality of attributes independently of a third-party server, the third-party server comprising any one of an issuer server, an acquirer server, a device that is remote to the payment server.

14. The server system as claimed in claim 13, wherein the rules repository comprises rules and criteria set by a plurality of merchants and a regulatory authority.

15. The server system as claimed in claim 9, wherein checking the at least one general attribute comprises checking historical purchase data of the user in a pre-defined time period from the one or more databases.

16. The server system as claimed in claim 9, wherein the plurality of attributes comprises age of the user, occupation of the user, location of the user or a merchant, and buying frequency of a product.

17. One or more non-transitory computer-readable storage media having computer-executable instructions for a payment transaction that, upon execution by a processor, cause the processor to at least:

receive, by a server system, a payment request for purchasing a plurality of products, the payment request associated with a merchant terminal;

determine a plurality of attributes to be verified for processing the payment request, the plurality of attributes determined based at least on applying a set of regulatory rules on a products-related information associated with the plurality of products, the plurality of attributes comprising at least one general attribute, and at least one user-specific attribute;

transmit a signal to the merchant terminal, the signal comprising a payment link and the at least one user-specific attribute of the plurality of attributes to be verified from a user, wherein the merchant terminal facilitates sending the payment link to a user device of the user;

provide a web page accessed via activation of the payment link on the user device, the web page providing at least an interface to the user to input user-specific information regarding the at least one user-specific attribute, wherein:

(1) the interface is configured to interactively authenticate an identity of the user, and (2) a type of interactive authentication is determined based on the plurality of attributes to be verified;

receive the user-specific information associated with the at least one user-specific attribute, the user-specific information provided as input by the user on the user device by accessing the payment link;

verify the plurality of attributes by accessing one or more databases, based at least on checking the at least one general attribute by applying a set of pre-defined rules, and performing verification of the user-specific information received from the user device by retrieving user-related data stored in the one or more databases;

determine that verification is successful; and process the payment request associated with a payment initiated by the merchant terminal.

18. The one or more non-transitory computer-readable storage media of claim 17, wherein the computer-executable instructions further cause the processor to:

perform a prior verification, wherein the prior verification comprises checking if information associated with at least one general attribute of the plurality of attributes is already available in the one or more databases;

authenticate a user identity via one of a biometric authentication or a security question authentication; and generate, the payment link including at least one user-specific attribute for which the information is not already available.

19. The one or more non-transitory computer-readable storage media of claim 17, wherein the computer-executable instructions further cause the processor to:

generate, by the merchant terminal, the payment request in response to receipt of a user request to purchase the plurality of products;

send, by the merchant terminal, the payment request comprising the products-related information to the server system;

receive, by the merchant terminal, the payment link corresponding to the payment request for purchasing the plurality of products; and send, by the merchant terminal, a short messaging service (SMS) comprising the payment link to the user device for making payment.

20. The one or more non-transitory computer-readable storage media of claim 19, wherein the computer-executable instructions further cause the processor to:

receive an identifier associated with the user along with the payment request; and check the one or more databases against the identifier for already available information associated with at least one of the plurality of attributes.

* * * * *